US008640194B2

(12) United States Patent  (10) Patent No.: US 8,640,194 B2
Inoue et al.  (45) Date of Patent: Jan. 28, 2014

(54) INFORMATION COMMUNICATION DEVICE AND PROGRAM EXECUTION ENVIRONMENT CONTROL METHOD

(75) Inventors: Hiroaki Inoue, Tokyo (JP); Junji Sakai, Tokyo (JP); Tsuyoshi Abe, Tokyo (JP); Masato Edahiro, Tokyo (JP)

(73) Assignee: NEC Corporation, Tokyo (JP)

( * ) Notice: Subject to any disclaimer, the term of this patent is extended or adjusted under 35 U.S.C. 154(b) by 1450 days.

(21) Appl. No.: 11/660,967

(22) PCT Filed: Aug. 15, 2005

(86) PCT No.: PCT/JP2005/014903
§ 371 (c)(1),
(2), (4) Date: Feb. 23, 2007

(87) PCT Pub. No.: WO2006/022161
PCT Pub. Date: Mar. 2, 2006

(65) Prior Publication Data
US 2008/0005794 A1   Jan. 3, 2008

(30) Foreign Application Priority Data

Aug. 25, 2004 (JP) .................................. 2004-245731

(51) Int. Cl.
*H04L 29/06* (2006.01)
(52) U.S. Cl.
USPC ......... 726/2; 726/4; 726/17; 726/27; 713/182
(58) Field of Classification Search
USPC ......................................... 713/375; 726/26, 2
See application file for complete search history.

(56) References Cited

U.S. PATENT DOCUMENTS

| 4,245,305 | A | * | 1/1981 | Gechele et al. | 710/25 |
|---|---|---|---|---|---|
| 4,658,349 | A | * | 4/1987 | Tabata et al. | 710/26 |
| 4,866,664 | A | * | 9/1989 | Burkhardt et al. | 709/227 |
| 5,146,596 | A | * | 9/1992 | Whittaker et al. | 710/116 |
| 5,689,714 | A | * | 11/1997 | Moyer | 713/310 |
| 6,199,181 | B1 | | 3/2001 | Reshef et al. | |
| 6,279,066 | B1 | * | 8/2001 | Velingker | 710/240 |
| 6,321,337 | B1 | | 11/2001 | Reshef et al. | |
| 6,507,904 | B1 | | 1/2003 | Ellison et al. | |
| 6,549,961 | B1 | * | 4/2003 | Kloth | 710/36 |
| 6,795,901 | B1 | * | 9/2004 | Florek et al. | 711/152 |

(Continued)

FOREIGN PATENT DOCUMENTS

| CN | 1388448 A | | 1/2003 |
|---|---|---|---|
| GB | 2318894 A | * | 5/1998 |

(Continued)

OTHER PUBLICATIONS

Lucci, Stephen, Gertner, Izidor, "Reflective-Memory Multiprocessor", IEEE, 1995.*

*Primary Examiner* — Mohammad L Rahman
(74) *Attorney, Agent, or Firm* — Foley & Lardner LLP

(57) ABSTRACT

A device and a method are provided for increasing processing speed and for ensuring system security when an application or a driver is added. The device includes a first CPU group that executes software composed of basic processing and an OS; a second CPU group that executes software composed of additional processing and OS corresponding to the additional processing, inter-processor communication means used for communication between the first CPU and the second CPU, and access control means that controls access made by the second CPU to a memory and/or an input/output device.

42 Claims, 28 Drawing Sheets

(56) References Cited

U.S. PATENT DOCUMENTS

| | | | |
|---|---|---|---|
| 6,820,063 B1 * | 11/2004 | England et al. | 705/54 |
| 7,076,652 B2 * | 7/2006 | Ginter et al. | 713/153 |
| 7,155,550 B2 | 12/2006 | Katoh et al. | |
| 7,590,864 B2 * | 9/2009 | Khan et al. | 713/189 |
| 7,725,558 B2 * | 5/2010 | Dickenson | 709/215 |
| 7,958,351 B2 * | 6/2011 | Luthi | 713/166 |
| 2002/0055979 A1 * | 5/2002 | Koch et al. | 709/212 |
| 2002/0099952 A1 | 7/2002 | Lambert et al. | |
| 2002/0165896 A1 * | 11/2002 | Kim | 709/102 |
| 2003/0126381 A1 * | 7/2003 | Vo | 711/152 |
| 2003/0204682 A1 * | 10/2003 | Ueno | 711/147 |
| 2005/0044375 A1 * | 2/2005 | Paatero et al. | 713/176 |
| 2006/0031940 A1 * | 2/2006 | Rozman et al. | 726/27 |

FOREIGN PATENT DOCUMENTS

| | | |
|---|---|---|
| JP | 56-072754 | 6/1981 |
| JP | 6-332864 | 12/1994 |
| JP | 2002-533791 A | 10/2002 |
| JP | 2002-351854 A | 12/2002 |
| JP | 2002-542537 A | 12/2002 |
| JP | 2004-500666 A | 1/2004 |
| WO | WO 02/14987 A2 | 2/2002 |

\* cited by examiner

FIG. 5

| ADDITIONAL-PROCESSING SIDE CPU | PERMISSION RANGE ADDRESS | | PERMITTED REFERENCE METHOD |
|---|---|---|---|
| | START ADDRESS | END ADDRESS | ACCESS TYPE |
| CPU#4 | 0x0001000 | 0x0002000 | R |
| CPU#2, #3 | 0xC0000000 | 0xF0000000 | R/W |
| CPU#3 | 0xE0000000 | 0xF0000000 | W |

RANGE MAY OVERLAP

FIG. 25

|  | BASIC DOMAIN | TRUSTED EXTENSION DOMAIN | UNTRUSTED EXTENSION DOMAIN |
|---|---|---|---|
| FUNCTION 1 | LEVEL A | — | — |
| FUNCTION 2 | LEVEL A | LEVEL B | — |
| FUNCTION 3 | LEVEL A, LEVEL B | LEVEL A, LEVEL B | — |
| FUNCTION 4 | LEVEL A, LEVEL B | LEVEL A, LEVEL B | LEVEL C |
| FUNCTION 5 | LEVEL A, LEVEL B | LEVEL A, LEVEL B, LEVEL C | LEVEL C, LEVEL D |

INFORMATION COMMUNICATION DEVICE AND PROGRAM EXECUTION ENVIRONMENT CONTROL METHOD

TECHNICAL FIELD

The present invention relates to an information processing device, and more particularly to a device and method suitable for maintaining security when additional processing, downloaded from a source external to the information processing device, is executed.

BACKGROUND ART

On an information communication terminal device such as a mobile phone, the basic processing (for example, call processing function, browser function for accessing the Internet, electronic mail function, screen control function, etc.) for implementing the basic function of the terminal device is usually installed in advance with the operating system. Additional processing (program) other than the basic processing described above is downloaded from an external source, such as the network, onto the terminal device by the user operation for execution and installation thereon. However, when the downloaded additional processing is executed, there is a possibility that the operating system and the basic processing are subjected to an attack from the additional processing.

FIG. 21 is a diagram schematically showing an example of the typical configuration of an information communication terminal device that executes downloaded additional processing. FIG. 21 is a block diagram schematically illustrating a well-known typical device configuration. In the description below, the additional processing is an application program or a device driver (also called an "I/O driver" that is software for processing an access request to a device and for processing an interrupt from a device) provided in native code (binary code generated by compiling or assembling on the vendor side).

When additional processing 23 is downloaded and executed (or is included into the operation system and executed when the additional processing 23 is a device driver) in the configuration shown in FIG. 21, there is a possibility that basic processing 22, an operating system (termed an OS) 21, a CPU (Central Processing Unit) 10, a memory 50, and an input/output (I/O) device 60 are directly attacked by the additional processing 23. The reason is that no means is installed for limiting an attack from the additional processing 23 to the basic processing 22, CPU 10, OS 21, memory 50, or input/output device (I/O) 60 and for implementing the safe execution environment. That is, in the configuration shown in FIG. 21, the additional processing 23 can arbitrarily issue a processing request to the basic processing 22, a processing request to the OS 21, and a processing request to the CPU 10, memory 50, and input/output device 60 and can freely access the hardware and software resources. For this reason, the additional processing 23, if malicious (or not malicious but infected by a virus), freely attacks the vulnerable OS 21, basic processing 22, and so on.

In some cases, an additional device driver is incorporated into the kernel of the OS 21, for example, as a resident (permanently resident) driver and, in this case, the reliability of the device driver directly affects the reliability and performance of the OS 21. The reason for this is apparent from the characteristics of a device driver that the device driver includes the processing settings to the device and the interrupt service that will be activated by the scheduler when an interrupt is received from the device and that the execution duration of the interrupt service (during which re-scheduling is inhibited) is limited to a very short time (for example, shorter than milliseconds) to maintain the processing performance. That is, an additional device driver, if malicious, can easily reduce the processing performance of an information processing device. This applies also to a non-resident, loadable driver (driver selectively loaded into, or unloaded from, memory). If an attack is made by a malicious driver that is installed as additional processing, the kernel of the OS 21 is attacked directly and a fatal (virtually inoperative) condition may result.

To solve this problem, several architectures have conventionally been proposed to limit the execution environment of downloaded additional processing for protecting the basic processing. The following outlines typical examples.

FIG. 22 is a diagram showing one typical example of the configuration that provides the software-based execution protection environment for additional processing. In the example shown in FIG. 22, the additional processing 23 coded in native code is executed on a virtual machine 24. For example, if the additional processing 23 is described in the JAVA (registered trademark) byte code, the downloaded JAVA (registered trademark) byte code is executed on a JVM (JAVA (registered trademark) virtual machine) that constitutes the virtual machine 24.

In this configuration, the basic processing 22 and the OS 21 are separated from the additional processing 23 on a software basis to ensure its security. That is, the additional processing 23 accesses the OS 21, CPU 10, memory 50, and input/output device 60 only via the virtual machine 24. Usually, the virtual machine 24 is not given an authority to execute in the kernel mode (for example, to execute a privileged instruction) of the OS 21 and, therefore, the additional processing 23 cannot directly operate the OS 21. Because the virtual machine 24 usually executes an instruction code received from the additional processing 23 in the interpreter mode, it is easy to monitor if the instruction and the operation of the additional processing 23 is correct. For example, by limiting an invalid access (for example, a large amount of data output to the network or the display) from the additional processing 23 to the hardware resources or software resources, the virtual machine 24 can also work as a software-based protective filter, protective wall, or protective gate. In this way, the basic processing 22 and the OS 21 are separated from the additional processing 23 via the virtual machine 24 on a software basis.

However, the virtual machine scheme shown in FIG. 22 has the following problems.

The system security is compromised when the downloaded additional processing 23 attacks a vulnerable point (for example, a security hole) of the virtual machine 24.

Furthermore, because the instruction codes such as JAVA (registered trade mark) byte codes are executed usually in the interpreter mode in which an instruction is interpreted and executed, one by one, the execution speed of the virtual machine 24 such as a JAVA (registered trademark) virtual machine is slow.

In addition, before executing the additional processing 23, the virtual machine 24 issues a system call to request the OS 21 to perform processing and, because the overhead of the system call is large, the processing speed is low. For example, the virtual machine 24 issues one or more system calls corresponding to one instruction of the additional processing 23. There are executed a sequence of control operations, including for example, context-switching from user mode to system mode caused by the issuing of a system call, decoding of the packet data of the system call and validity checking of parameters (error detection processing) in the system call by the system call entry module of the OS 21, dispatching of processing (dispatch), passing of processing result and the context switching at the time of completion of the processing, switching from the kernel space to the user space and the like and the overhead becomes large.

In the configuration shown in FIG. 22, a device driver cannot be included into the OS 21 as the additional processing 23. As apparent from FIG. 22, the virtual machine 24 is in a layer higher than that of the OS 21. The virtual machine 24 is configured in such a way that it issues a processing request to the OS 21, receives the processing result from the OS 21, and returns the result to the additional processing 23 as necessary, based on the code of the additional processing 23. Thus, an attempt to include the additional processing into the OS 21 as a device driver requires that the virtual machine, which controls the execution of the additional processing, be also included into the OS 21. In principle, such a configuration is impossible in the virtual machine mode shown in FIG. 22.

As another software-based security management architecture, the configuration shown in FIG. 23 is also known. As shown in FIG. 23, the additional processing 23, to which a certificate 25 which is for certifying the authenticity of the additional processing is attached, is downloaded onto a terminal (information processing device). The terminal side checks the contents of the attached certificate 25 and, if the attached certificate 25 is authenticated successfully, the downloaded additional processing 23 is installed and executed. A digital signature (ITU-T X509) may be used for the certificate 25. For example, the certificate 25 stores a certifying organization, its public key, and the digital signature (signature generated by encrypting the certifying organization or public key with the private key of the CA) of the CA (Certificate Authority). To authenticate the certificate, the digital signature of the CA is decrypted by the public key of the CA to check if the result matches the content of certificate data and, if they match, the data of the certificate is determined authentic. Alternatively, the certificate 25, provided it can certify an authentic vendor, may be any certificate. The driver signing function of a device driver is implemented on Windows (registered trademark) 2000.

The architecture shown in FIG. 23, in which the additional processing 23 can be provided in native code, makes the execution faster than that of the virtual machine method shown in FIG. 22. In addition, an application and a device driver can be executed as the additional processing 23. However, the system reliability depends absolutely on the security of the additional processing 23. That is, a problem with the additional processing 23 that cannot be detected in advance, if any, may cause a fatal damage to the system.

FIG. 24 is a diagram showing the configuration of a processor that performs hardware based security management. Referring to FIG. 24, a CPU 11 has two modes, secure mode 12 and non-secure mode 13, and the downloaded additional processing 23 and the OS 21B corresponding to the additional processing 23 are executed only in the non-secure mode 13. A memory management unit 14 manages the memory area (address space) executed in the non-secure mode 13 and the memory area accessed in the secure mode 12 separately and inhibits access from the non-secure mode 13 to the memory area in the secure mode 12. That is, the memory management unit 14 controls memory access from the non-secure mode 13 and inhibits access from the non-secure mode 13 to the memory area in the secure mode 12.

Thus, in the configuration shown in FIG. 24, the basic processing 22 is executed in the secure mode 12 and the CPU is virtually separated from the CPU for executing the additional processing 23 to increase security.

However, the secure mode and the non-secure mode are executed on the CPU in a time-division manner and, if control is not returned from the non-secure mode, the system operation in the secure mode is not executed.

Since the non-secure mode and the secure mode are subjected the time-division processing, an overhead such as a mode transition and the like is required when the mode is switched.

Another problem is that, when the additional processing 23 is a device driver that is embedded within the OS 21B of the non-secure mode and if the driver is malicious, there is a possibility that control is not returned to the secure mode and the system is fatally damaged.

Patent Document 1, which will be given below, discloses a processor that has a separation area in a system memory, as in the configuration shown in FIG. 24, to provide a normal execution mode and a separation execution mode. In the device described in Patent Document 1, the normal execution mode is a mode in which the processor runs in the non-security environment, that is, in the usual operation mode that has not the security function provided in the separation execution mode with access to the separation area inhibited from the normal execution mode, while the separation execution mode is a mode in which the execution of a predetermined separation instruction is supported. This configuration also requires a mode transition overhead at switching time because the normal execution mode and the separation execution mode are executed in the time division mode.

Another configuration is disclosed in which two processor units and a switch unit are provided. In this configuration, one of the processor units is connected to the public data communication network, and the other processor unit, which is not connected to the public data communication network, functions as a data security unit (see Patent Document 2 which will be given below). In the system described in Patent Document 2, the processor unit connected to the public data communication network and the data security unit are separated by a switch to ensure the security of the data security unit. However, no countermeasure is taken for the processor unit, connected to the public data communication network, against an attack that may result from the execution of the additional processing described above (additional processing downloaded from the network). Although the data security unit is safe, the processor unit connected to the public data communication network has not security mechanism effective for an attack by the additional processing. For this reason, one of the schemes described above must be employed to perform the security management of the processor unit connected to the public data communication network.

A still another configuration is disclosed in Patent Document 3 for use in a system where a separated execution program or the operating system are executed simultaneously on a processor. During the execution of a first program in this configuration, the memory space used only by the first program is set and the communication between the first program and the computer execution environment is performed via a single link, including the use of shared memory space, a dedicated interrupt, or a dedicated I/O port, to protect the execution environment against an incorrect program. In the restricted execution environment, the first program is not allowed to access the resources of the processor except the memory space that is set and the single link. Because, in the system described in Patent Document 3, the first program is not allowed to access the resources of the processor except the memory space that is set and the single link (use of shared memory space, dedicated interrupt, or dedicated I/O port), the first program cannot be used as a device driver and therefore cannot be applied to the additional processing including a device driver.

Patent Document 4, a publication given below disclosing a technology related to the inter-processor communication means used in the present invention that will be described later, discloses the inter-CPU communication scheme for use in a multiprocessor system. Patent Document 4 describes the following configuration as a conventional technology. That is, when a CPU 2 interrupts a CPU 1 during the inter-CPU communication via the shared memory in a multiprocessor system, the CPU 2 writes communication information in its own inter-CPU communication information writing area in the fixed area provided for the CPU 1 to generate an interrupt and, upon detecting the interrupt, the CPU 1 accesses the inter-CPU communication information writing area corresponding to the CPU 2 to execute the interrupt processing. In addition, Patent Document 4 describes an invention that reduces the number of accesses to the shared memory.

Patent Document 1: Japanese patent Kohyo Publication No. JP-P2004-500666A
Patent Document 2: Japanese patent Kohyo Publication No. JP-P2002-542537A
Patent Document 3: Japanese patent Kohyo Publication No. JP-P2002-533791A
Patent Document 4: Japanese Patent Kokai Publication No. JP-A-6-332864

DISCLOSURE OF THE INVENTION

Problems to be Solved by the Invention

As described above, in the conventional devices that take counter measures for ensuring security against an attack from downloaded, malicious, or faulty additional processing, there have been left practically various sorts of problems, such as the problem in the processing performance, the problem in which a device driver cannot be executed, and the problem in which security cannot be guaranteed. Especially, the architecture in which an additional device driver cannot be downloaded from a source external to an information processing device, such as that shown in FIG. 22 and FIG. 24, means that neither devices nor functions can virtually be added and this disadvantage reduces availability. On the other hand, increased security and reliability are required for an additional device driver which is executed in the kernel mode because the device driver directly affects the OS and system reliability.

Accordingly, it is an object of the present invention to provide a device and a method that increase the processing speed in a simple configuration and ensure the security and reliability when an application program or a device driver is added.

Means to Solve the Problems

The following describes the overview of the present invention to achieve the above object.

A device according to one aspect of the present invention comprises a plurality of processors wherein the plurality of processors constitute a plurality of domains according to a trust level of processing to be executed and the processors in different domains communicate with each other via inter-processor communication means, the device further comprising access control means that controls access, made by a processor belonging to a domain where relatively lower security processing is executed, to a memory and/or an input/output device belonging to a domain where relatively higher security processing is executed.

A program execution environment control method according to one aspect of the present invention, wherein a plurality of processors, which constitute an information processing device, are divided into a plurality of domains according to a trust level of a program to be executed, the program execution environment control method comprising the steps of sending, by the processors in different domains, data or a command with each other via inter-processor communication means; and checking access, which is made by a processor belonging to a domain where a program whose trust level is relatively lower is executed to a memory and/or an input/output device belonging to a domain where a program whose trust level is relatively higher is executed to execute only a permitted access, by access control means.

A device according to another aspect of the present invention comprises at least one processor (termed "first class processor") that executes predetermined first class processing; at least one processor (termed "second class processor") that executes predetermined second class processing that is different from the first class processing; a memory and an input/output device; inter-processor communication means that controls communication between the first class processor and the second class processor; and access control means that controls access made by the second class processor to the memory and/or the input/output device.

In the device of the present invention, the first class processing includes relatively higher trust level processing and the second class processing includes relatively lower trust level processing. In the present invention, the first class processing includes vendor-provided basic processing and the second class processing includes additional processing downloaded from a network or a storage medium. In the present invention, the second class processing may include a device driver and/or an application program to be executed in the second class processor.

In the device of the present invention, the inter-processor communication means comprises inter-processor communication means that performs inter-processor communication for passing information from the first class processor side to the second class processor; and inter-processor communication means that performs inter-processor communication for passing information from the second class processor side to the first class processor.

In the device of the present invention, the inter-processor communication means preferably comprises an interrupt control device that accepts an interrupt request from a processor on the information sending side and issues an interrupt to a processor on the information receiving side. In the present invention, the inter-processor communication means preferably comprises an interrupt control device and a shared memory corresponding to an interrupt target processor wherein the interrupt control device comprises an interrupt indication unit that accepts an interrupt request from an interrupt-requesting processor and issues an interrupt request to the interrupt target processor; an interrupt holding unit that holds the interrupt request accepted by the interrupt indication unit; and an interrupt cancellation unit that cancels the interrupt in response to an interrupt processing completion notification from the interrupt target processor and wherein the shared memory comprises a communication area that stores data transferred from the interrupt-requesting processor to the interrupt target processor; and an exclusion control area that performs exclusion control for the communication area.

In the device of the present invention, the access control means preferably comprises means that stores access permission data which stores information on access from the second class processor to the memory and/or input/output device; and access permission means that monitors access from the second class processor to the memory and/or the input/output device, references the access permission data, and determines whether the access can be permitted. In the present invention, the means that stores access permission data stores, for each processor of the second class processors that is permitted access, an address range for which access is permitted and information on access types permitted for the address range.

A device according to another aspect of the present invention comprises further comprises at least on processor (termed "third class processor") that executes predetermined third class processing; inter-processor communication means that performs communication between the second class processor and the third class processor; and second access control means that controls access made by the third class processor to the memory and/or the input/output device connected to the first class processor.

A device according to another aspect of the present invention comprises at least one processor (termed "third class processor") that executes predetermined third class processing; and inter-processor communication means that performs communication between the second class processor and the third class processor, wherein each of the first to third class processors comprises a memory and an input/output device connected via a bus and access made by the second class processor to the memory and/or the input/output device, connected to the first class processor, is controlled by the access control means, the device further comprising second access control means that controls access made by the third class processor to the memory and/or the input/output device connected to the first class processor and/or to the memory and/or the input/output device connected to the second class processor.

A device according to another aspect of the present invention comprises (A) a basic domain that comprises a basic software environment; an external device and/or a file system; and an operating system, the basic domain further comprising a security database that stores security information on downloaded data and native code download management means that controls a download of native-code downloaded data, (B) a trusted extension domain that comprises native code download execution means that controls a download of native-code downloaded data; and an operating system, wherein a downloaded application program (termed "trusted application program"), which is determined as trusted by the native code download management means in the basic domain, is executed and a downloaded device driver (termed "trusted driver"), which is determined as trusted by the native code download management means in the basic domain, is installed in the operating system and a permitted external device prepared in advance is accessed by the trusted driver to execute trusted additional processing, and (C) an untrusted extension domain wherein native code download execution means that controls a download of native-code downloaded data, an operating system, and a downloaded application program (termed "untrusted application program"), which is determined as untrusted by the native code download management means in the basic domain, are executed and a downloaded device driver (termed "untrusted driver"), which is determined as untrusted by the native code download management means in the basic domain, is installed in the operating system and a permitted external device prepared in advance is accessed by the device driver to execute untrusted additional processing and wherein the basic domain, the trusted extension domain, and the untrusted extension domain are implemented, respectively, in the first class processor, the second class processor, and the third class processor.

A method according to another aspect of the present invention comprises steps of, when downloaded data is input from the external device in the basic domain and if the basic function recognizes the downloaded data as a downloaded application program, checking a certificate of the downloaded application program by the native code download management means in the basic domain; and, if a result of the checking indicates that the certificate is valid, sending the downloaded application program to the native code download execution means in the trusted extension domain.

The method of the present invention may further comprise the steps of, when downloaded data is input from the external device in the basic domain and if the basic function recognizes the downloaded data as a downloaded driver, checking a certificate of the downloaded driver by the native code download management means; if a result of the checking indicates that the certificate is valid, sending the downloaded driver to the native code download execution means in the trusted extension domain; and installing the downloaded driver into the operating system in the trusted extension domain by the native code download execution means in the trusted extension domain.

The method of the present invention may further comprise the steps of, when downloaded data is input from the external device in the basic domain and if the basic function recognizes the downloaded data as a downloaded application program, checking a certificate of the downloaded application program by the native code download management means in the basic domain; and, if a result of the checking indicates that there is no certificate or a content of the certificate is invalid, sending the downloaded data to the native code download execution means in the untrusted extension domain via the native code download execution means in the trusted extension domain.

The method of the present invention may further comprise the steps of, when downloaded data is input from the external device in the basic domain and if the basic function recognizes the downloaded data as a downloaded driver, checking a certificate of the downloaded driver by the native code download management means in the basic domain; if a result of the checking indicates that there is no certificate or a content of the certificate is invalid, sending the downloaded driver to the native code download execution means in the untrusted extension domain via the native code download execution means in the trusted extension domain; and installing the downloaded driver into the operating system in the untrusted extension domain by the native code download execution means in the untrusted extension domain.

The method of the present invention, wherein the trusted extension domain further comprises a basic function library that includes a processing group, which issues a request to a basic function in the basic software environment in the basic domain, as a library, may further comprise the steps of sending a request to the native code download management means in the basic domain by the basic function library in response to a request from the application program downloaded in the trusted extension domain using a certificate of the application program; and checking by the native code download management means in the basic domain if the request received from the trusted extension domain is valid (if the request corresponds to the certificate of the application program) and, if the request is valid, requesting the basic function in the basic software environment to process the request. The method may further comprise the steps of processing the request and notifying a completion of the processing to the native code download management means in the basic domain by the basic function in the basic domain; and notifying, by the native code download management means in the basic domain, the completion to the basic function library in the trusted extension domain and notifying the completion of the processing to the application program.

The method of the present invention, wherein the trusted extension domain further comprises a basic function library that includes a processing group, which issues a request to a basic function in the basic software environment in the basic domain, as a library, the method further comprising the steps of send data from the application program, downloaded in the untrusted extension domain, to the application program in the trusted extension domain; issuing, by the application program in the trusted extension domain, a request, which includes the data received from the downloaded application program in the untrusted extension domain, to the basic function library; sending, by the basic function library, the request to the native code download management means in the basic domain in response to the request from the trusted extension domain; checking, by the native code download management means in the basic domain, if the received request is valid (if the request corresponds to the certificate of the application program); if the request is valid as a result of the checking, requesting a user to confirm the request and, if a confirmation result indicates permission, requesting the basic function in the basic software environment to process the request; and, if the confirmation result of the user indicates no permission, notifying no permission to the basic function library by the native code download management means.

In the present invention, the method may further comprise the steps of processing the request and notifying a completion of the processing to the native code download management means in the basic domain by the basic function; notifying, by the native code download management means in the basic domain, the completion to the basic function library in the trusted extension domain; notifying the completion of the processing to the downloaded application program; and notifying, by the downloaded application program, the completion of the processing to the downloaded application program in the untrusted extension domain.

A information processing device according to the present invention comprises a plurality of processors, wherein the plurality of processors constitute processors constituting a first domain and a second domain different from the first domain and the second domain includes the processor having at least one processing that is lower in a trust level than processing executed by the processor belonging to the first domain, the information processing device further comprising inter-processor communication means that controls communication between the processor in the first domain and the processor in the second domain; and access control means that limits access, made by the processor belonging to the second domain, to a memory and/or an input/output device belonging to the first domain according to a trust level of processing executed in the second domain.

In the information processing device of the present invention, the access control means comprises means that stores access permission data and access permission means that monitors access from the processor belonging to the second domain to the memory and/or the input/output device, references the access permission data, and determines whether the access can be permitted.

In the information processing device of the present invention, the access control means may further comprise access permission data update means that updates the access permission data.

In the information processing device of the present invention, the access control means may further comprise access monitoring means that acquires access information on access by the processor belonging to the second domain and learning means that stores the access information.

In the information processing device of the present invention, the inter-processor communication means may comprise an interrupt control information processing device that receives an interrupt request from a processor on a sending side of information and issues an interrupt to a processor on a receiving side of the information.

A portable information terminal according to the present invention comprises a plurality of processors, wherein the plurality of processors constitute processors constituting a first domain and a second domain different from the first domain and the second domain includes the processor having at least one processing that is lower in a trust level than processing executed by the processor belonging to the first domain, the portable information terminal further comprising inter-processor communication means that controls communication between the processor in the first domain and the processor in the second domain; and access control means that limits access, made by the processor belonging to the second domain, to a memory and/or an input/output device belonging to the first domain according to a trust level of processing executed in the second domain.

Meritorious Effects of the Invention

According to the present invention, a plurality of processors constitute domains according to the security of processing, the processor communication between the domains is performed via the inter-processor communication means, access control means is provided that controls the permission of access, made by a processor on the low-security domain side, to a memory and/or an input/output device on the high-security domain side, and a downloaded device driver or application is executed on the low-security domain side to ensure security.

According to the present invention, the processing in the high-security domain and the processing in the low-security domain are executed in parallel by the processors in the domains. This makes it possible to execute high-speed processing and to execute synchronization and cooperation processing between the processor in the high-security domain and the processor in the low-security domain.

BRIEF DESCRIPTION OF THE DRAWINGS

FIG. 5 is a diagram showing an example of access permission data referenced by the access control means in one embodiment of the present invention.

FIG. 25 is a diagram showing an example of trust levels in one embodiment of the present invention.

Figure 1:
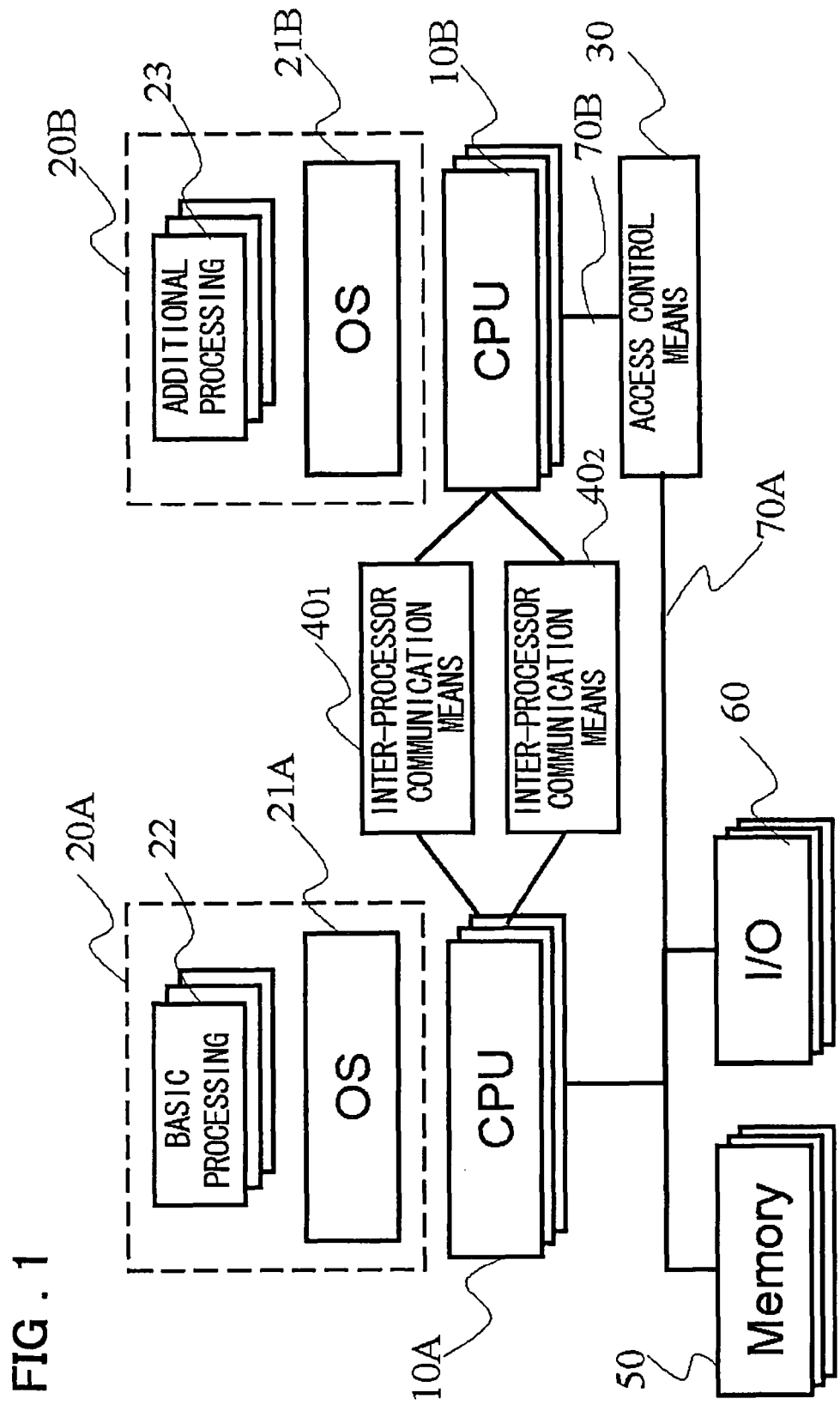
FIG. 1 is a diagram showing the hardware configuration of one embodiment of the present invention.

EXPLANATIONS OF SYMBOLS 10,10A,10B,10C CPU
11 CPU
12 Secure mode
13 Non-secure mode
14 Memory management unit
15 Separation means
20,20A,20B,20C Software
21,21A,21B,21C OS
22 Basic processing
23,23B,23C Additional processing
24 Virtual machine
25 Certificate
30 Access control means
31 Access permission means
32 Access permission data
40 Inter-processor communication means
41 Interrupt control device
410-41n Interrupt control device for CPU#0-CPU#n
42 Shared memory
420-42n Communication area for CPU#0-CPU#n
50,50A,50B,50C Memory
60,60A,60B,60C Input/output device (I/O)
70A Basic-processing side bus
70B Additional-processing side bus
100A Basic domain
100B Trusted extension domain
100C Untrusted extension domain
101A,101B,101C OS
102A External device
102A' Virtual external device
102B,102C Permitted external device
102B',102C' Permitted virtual external device
103 Dedicated file system
103' Virtual dedicated file system
104A Native code download management function
104B,104C Native code download execution function
105 Security policy database
110 Basic software environment
111 Basic application
112 Basic function
113 Basic function library
120A,120B,120C Downloaded application
121B,121C Downloaded driver
200A,200B,200C Virtual CPU
210A,210B,210C Virtual machine monitor
411 Interrupt Indication unit
412 Interrupt status holding unit
413 Interrupt cancellation unit
421 Communication queue
422 Exclusive control area

BEST MODE FOR CARRYING OUT THE INVENTION

The best mode for carrying out the present invention will be described. In one preferred embodiment of the present invention, a plurality of CPUs in an information processing device in a multi-CPU configuration, where a plurality of CPUs are provided, are divided into a plurality of domains (for example, basic domain, trusted domain, and untrusted domain) according to the trust level of programs (processing) to be executed. Each domain has one or more CPUs, and the CPUs in different domains communicate with each other via inter-processor communication means (for example, 40 in FIG. 1). At the same time, when a CPU belonging to a domain, where low-security processing such as additional processing is performed, accesses a memory and an input/output device in a domain where high-security processing is performed, access control means (for example, 30 in FIG. 1) determines whether or not the access request is permitted and access is made only when the access request is permitted.

In this specification, a "trust level" refers to a level that is set for each rank of security level according to a security policy based on an electronic certificate indicating the level of security assigned to each processing.

For example, the security level is set based on a security policy for each processing to which a digital signature is attached. For example, as shown in FIG. 25, Level A: Password is required
Level B: Does not confirm twice
Level C: Confirm at each execution
Level D: Confirm at each access Security levels are assigned to domains according to the function that is executed.

For example, though only security levels of the same kind may be provided in one domain as follows, Level A to basic domain
Level B to trusted extension domain and
Level C to untrusted domain the present invention is not limited to this configuration. That is, one domain may include plural kinds of security levels. For example, as shown in FIG. 25, Level A or higher and Level B or higher may be provided in the basic domain according to the importance of the function to be executed and Level B or higher and level C or higher may be provided in the trusted extension domain according to the function to be executed.

Such a setting allows the security levels to be set based on any certificate or any security policy or to be set freely according to the function to be executed or according to the number of domains.

In one embodiment of the present invention that has the configuration described above, downloaded additional processing (including a device driver, an application program) is executed on a CPU on the low-security domain side that is of a separate configuration in view of hardware from that in a high-security domain to ensure the security of the high-security domain.

In this specification, a "download" includes a download onto an information device not only via a data communication network provided by the carrier of a mobile phone or a standard wireless LAN network but also via an accumulation-type media such as an SD card and a wired communication/medium such as a USB.

In one embodiment of the present invention, a CPU in a high-security domain and a CPU in a low-security domain are not separated for control via a switch but are connected by inter-processor communication means that allows them to communicate with each other. This configuration makes it possible for the CPU in the high-security domain and the CPU in the low-security domain to synchronize and cooperate with each other while guaranteeing security.

This inter-processor communication means (40 in FIG. 1) passes data (commands) from a CPU in one domain to a CPU in another domain to prevent a direct attack to a CPU in some other domain. For example, even if a large amount of data is sent continuously from a CPU on a low-security domain side to a CPU in a high-security domain in order to degrade the performance of the CPU in the high-security domain or to cause an over flow, the inter-processor communication means suppresses such a condition and prevents the data from being transmitted to the CPU in the high-security domain.

In one embodiment of the present invention, access control means (30 in FIG. 1) controls a CPU in a low-security domain side and allows it to access only a pre-permitted memory space and input/output device only in a pre-permitted mode. This prevents downloaded additional processing from making an attack against a high-security domain. Alternatively, the access control means controls the bandwidth and flow amount, as necessary, to prevent downloaded additional processing from making various attacks against a high-security domain. The following describes the present invention with reference to the embodiments.

EMBODIMENTS

FIG. 1 is a diagram showing the configuration of one embodiment of the present invention. Referring to FIG. 1, the configuration comprises a CPU group 10A that executes software 20A composed of basic processing 22 and an OS 21A, a CPU group 10B that executes software 20B composed of additional processing 23 and an OS 21B corresponding to the additional processing, inter-processor communication means 401 and 402 that perform communication between the CPU groups 10A and 10B, and access control means 30 that controls access from the CPU group 10B to a memory 50 and/or input/output devices (I/O) 60. Although each of the CPU group 10A and the CPU group 10B consists of plural (3) CPUs in FIG. 1, each group may of course consists of one CPU. The number of CPUs need not, of course, be equal between the CPU group 10A and the CPU group 10B. In the description below, the CPU group 10A and the CPU group 10B are called simply CPU 10A and CPU 10B. In this embodiment, the downloaded additional processing 23 contains native code in the binary format. The additional processing 23 may also be a downloaded source program compiled (assembled) into the binary format. In the software 20A, there may well be provided one or plural items of basic processing (22) and one or plurality of OSs (21). In the software 20B, there may well be provided one or plural items of additional processing (23) and one or plurality of OSs (21B).

According to this embodiment, the CPU 10B that executes the additional processing 23 is provided separately from the CPU 10A that executes the basic processing 22. The CPUs 10A and 10B can operate independently, the processing can be executed fast while increasing security, and application programs and device drivers can be executed. Of course, it is possible to configure the CPU 10A, which executes the basic processing 22, as a master and the CPU 10B, which executes the additional processing 23, as a slave to allow the slave side to run under the supervision of the master. In this case, the CPU 10B receives a command from the CPU 10A via inter-processor communication means 402 to execute the additional processing 23.

The inter-processor communication means 401 and 402 control the transfer of data between the CPU 10A and the CPU 10B. The CPUs 10A and 10B, which are independent, can execute processing (programs) in parallel and, at the same time, can also perform synchronization and cooperation (co-ordination) between the CPUs 10A and 10B via the inter-processor communication means 401 and 402. For example, when the user instructs the execution of additional processing from the screen of the display, a request to start the additional processing 23 is sent from the CPU 10A, which executes the basic processing 22, to the CPU 10B via the inter-processor communication means 401 and the additional processing 23 is executed on the CPU 10B. The CPU 10B sends the execution result to the CPU 10A via the inter-processor communication means 402, and the screen control routine of the basic processing 22 presents the information, which reflects the execution result of the additional processing 23, to the user.

In this embodiment, if an access request is made to the memory 50 and the input/output device (I/O) 60 during the execution of the additional processing 23 on the CPU 10B, the access control means 30 controls the permission of the access to allow only a permitted access to be executed on the memory 50 and the input/output device (I/O) 60. If the additional processing 23 is executed on the OS 21B in the CPU 10B and a processing request is issued from the additional processing 23 to the basic processing 22 or the OS 21A, the request is notified to the CPU 10A via the inter-processor communication means 401. That is, the additional processing 23 cannot directly control the basic processing 22. For example, even if the malicious additional processing 23 issues a request frequently to place a burden on, and to significantly deteriorate the execution performance of, the basic processing in the CPU 10A side, the inter-processor communication means 401 does not transmit such a request to the CPU 10A side, thereby guarding against the attack and ensuring security.

In the example shown in FIG. 1, the inter-processor communication means 401 controls the information transfer from the CPU 10B to the CPU 10A and the inter-processor communication means 402 controls the information transfer from the CPU 10A to the CPU 10B. Alternatively, it is of course possible for one inter-processor communication device to perform a bi-directional data transfer. In this embodiment, when inter-CPU communication is required among the multiple CPUs 10A that execute the basic processing 22, inter-CPU communication is performed without using the inter-processor communication means 40. This also applies to the multiple CPUs 10B that execute the additional processing 23. However, when some of the plurality CPUs of the CPU group 10B are dynamically switched as the elements of the CPU group 10A as will be described later, the CPU group 10B logically belongs to the CPU group 10A but inter-CPU communication may be performed via the inter-processor communication means 40.

In this embodiment, an application program or a device driver can be downloaded, installed, and executed as the additional processing 23. An added device driver is included in the OS 21B and executed on the CPU 10B with the access to the input/output device 60 controlled under the supervision of the access control means 30.

In a portable information communication device such as a mobile phone or a PDA, the basic processing 22 and the OS 21A, shown in FIG. 1, are normally stored in a rewritable nonvolatile memory (EEPROM: Electrically Programmable and Erasable ROM) not shown, and the CPU 10A fetches an instruction code from the EEPROM and decodes the instruction to execute the instruction. Similarly, the additional processing 23 and the OS 21B are stored in an EEPROM separate from that of the CPU 10A, and the CPU 10B fetches an instruction code from the EEPROM and decodes it for execution. That is, the memory in which the OS 21A is stored to execute the basic processing 22 and the memory in which OS 21B is stored to execute the additional processing 23 are separated between the basic processing side and the additional processing side on a hardware basis. The instruction codes of the basic processing and the OS stored in the EEPROM are executed, while the data such as tables initialized, referenced, and updated by a program executed in the CPUs 10A and 10B is expanded into the memory 50, composed of a DRAM (Dynamic Random Access Memory), when the OS is started. The access control means 30 manages the memory area, from or into which data is read or written by the CPU 10B, to limit access to the memory area referenced by the CPU 10A. On a general information processing device other than a portable information communication terminal, it is also possible to provide two separate memories: a memory in which the basic processing 22 and the OS 21A are loaded and from which the CPU 10A fetches an instruction code and a memory in which the additional processing 23 and the OS 21B are loaded and from which the CPU 10B fetches an instruction code. It is also possible to provide two separate areas, that is, the area in which the basic processing 22 and the OS 21A are loaded and the area in which the additional processing 23 and the OS 21B are loaded, in the memory 50 of a general information processing device and to manage a read/write access from the CPU 10B to the memory 50 by means of the access control means 30. In this case, it is also possible to store the code, which is only referenced by the CPU 10A and CPU 10B, in the common memory area and to cause the access control means 30 to control access to the common memory area so that the CPU 10B can only read the common memory area.

When the remaining capacity of the battery in a portable information processing device becomes low, the remaining battery capacity can be saved by forcing the devices, except the CPU that performs the basic processing, to shut down or by shutting down one or more CPUs according to the reliability of execution processing beginning with those CPUs that execute less reliable processing. To do so, the CPU that performs the basic processing determines which CPUs to shut down and shuts them down, based on the information on the remaining battery capacity obtained by the means that detects the remaining battery capacity and the means that notifies the detection result.

Because the resources of a portable information processing device, for example, the bandwidth of communication with external sources or the amount of nonvolatile memory, are further limited, the relative ratio of resource allocation can be changed according to the reliability. For example, this is done by causing the CPU, which executes the basic processing, to determine the following:

Allow resources to be preferentially allocated when the reliability of processing to be executed is high and Limit resources when the reliability of the processing to be executed is low.

Figure 2:
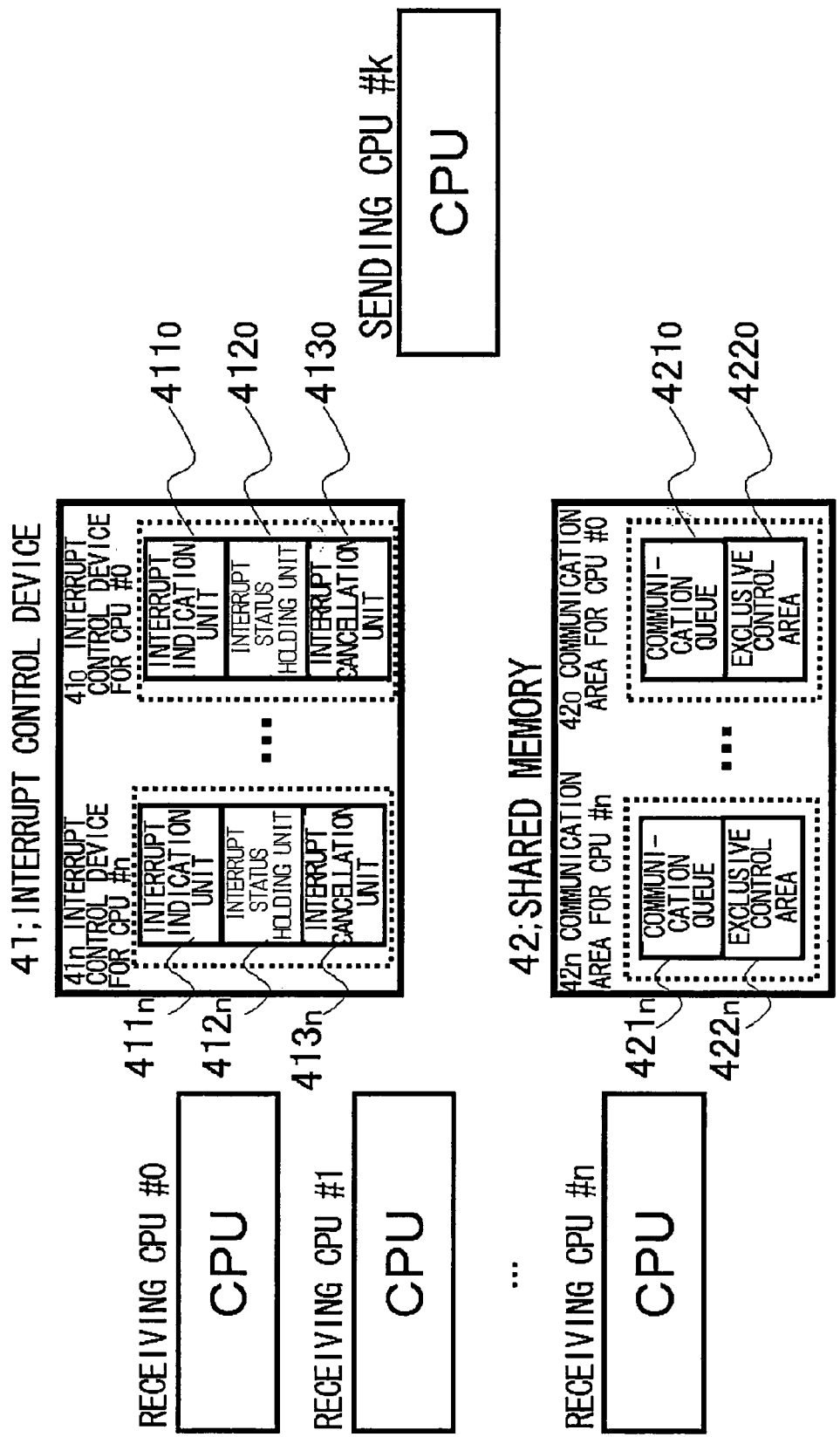
FIG. 2 is a diagram showing the configuration of inter-processor communication means in one embodiment of the present invention.

FIG. 2 is a diagram showing an example of the hardware configuration of the inter-processor communication means used in one embodiment of the present invention. Referring to FIG. 2, a set of an interrupt control device 41 and a shared memory 42, provided between the CPUs (CPU that executes basic processing and CPU that executes additional processing) on the right and left sides, constitutes the inter-processor communication means 401 and 402 in FIG. 1 in its entirety. The interrupt control device 41 comprises n interrupt control devices 410-41$n$ corresponding to CPU#0, CPU#1, ..., CPU#n, and each interrupt control device comprises an interrupt indication unit 411, an interrupt status holding unit 412, and an interrupt cancellation unit 413. The shared memory 42 comprises n communication areas 420-42$n$ corresponding to CPU#0, CPU#1, ..., CPU#n, and each communication area comprises a communication queue 421 in which send information (data, messages) is queued or buffered and an exclusion control area 422 used for mutually exclusion control.

For example, assume that the configuration comprises two CPUs: CPU#0 and CPU#1. In this case, the interrupt control device 411 for CPU#1 and the communication area 421 for CPU#1 constitute the inter-processor communication means 401 from CPU#0 to CPU#1, and the interrupt control device 410 for CPU#0 and the communication area 420 for CPU#0 constitute the inter-processor communication means 402 from CPU#1 to CPU#0.

The interrupt control device 41 and the shared memory 42 are bus-connected to CPU#0, CPU#1, ... CPU#n. In the communication queue 421 in the shared memory 42, a buffer pointer (for example, the address of a buffer area in the memory 50), in which send data is stored, may also be set instead of setting the send data itself.

In this embodiment, the exclusion control area 422$i$ of CPU#i in the shared memory 42 is provided for mutually exclusion control for preventing one CPU from using the communication area 42$i$ of CPU#i when another CPU already occupies the communication area 42$i$ of CPU#i. That is, the exclusion control area 422$i$ of CPU#i is used to store synchronization management information such as a semaphore and a flag used for mutex.

The mutually exclusion control mechanism implemented in the shared memory 42 guarantees data consistency between the sending CPU and the receiving CPU.

The mutually exclusion control mechanism prevents the CPU on the sending side from issuing an interrupt request to the receiving CPU when the exclusion control area 422 is locked, thus preventing the generation of an invalid interrupt, such as frequent data transfer from the sending CPU to the receiving CPU.

The exclusion control area 422 may also be used to perform the lock management of placing an entry into (enqueue), or removing an entry from (dequeue), the queue.

If multiple interrupts are allowed to be issued to one receiving CPU via the interrupt control device 41 in the configuration shown in FIG. 2, multiple communication queues 421 and exclusion control areas 422 are provided in the communication area of each CPU, one for each interrupt, in the shared memory 42.

Although not limited thereto, the shared memory 42 may be a predetermined memory area in the memory 50 shown in FIG. 1 or may be provided in the inter-processor communication means 40 separately from the memory 50. Although not shown, the interrupt request lines from the interrupt control device 410-41*n* may be connected to the receiving CPU in parallel (the number of interrupt lines is increased) or may be connected in the daisy-chain configuration.

Upon receiving an interrupt request from the interrupt control device 41, a sequence of control operation described below is executed. The receiving CPU notifies the reception of the interrupt request to the interrupt control device 41, the interrupt control device 41 transfers the interrupt device number (interrupt vector information) to a data line not shown, the receiving CPU generates an interrupt vector from the interrupt device number, the interrupt service routine to be executed in the receiving CPU is started via the scheduler, and the interrupt service routine acquires data from the communication queue in the corresponding shared memory 42 and releases (unlocks) the semaphore used for mutex in the exclusion control area to return control from the interrupt.

Figure 3:
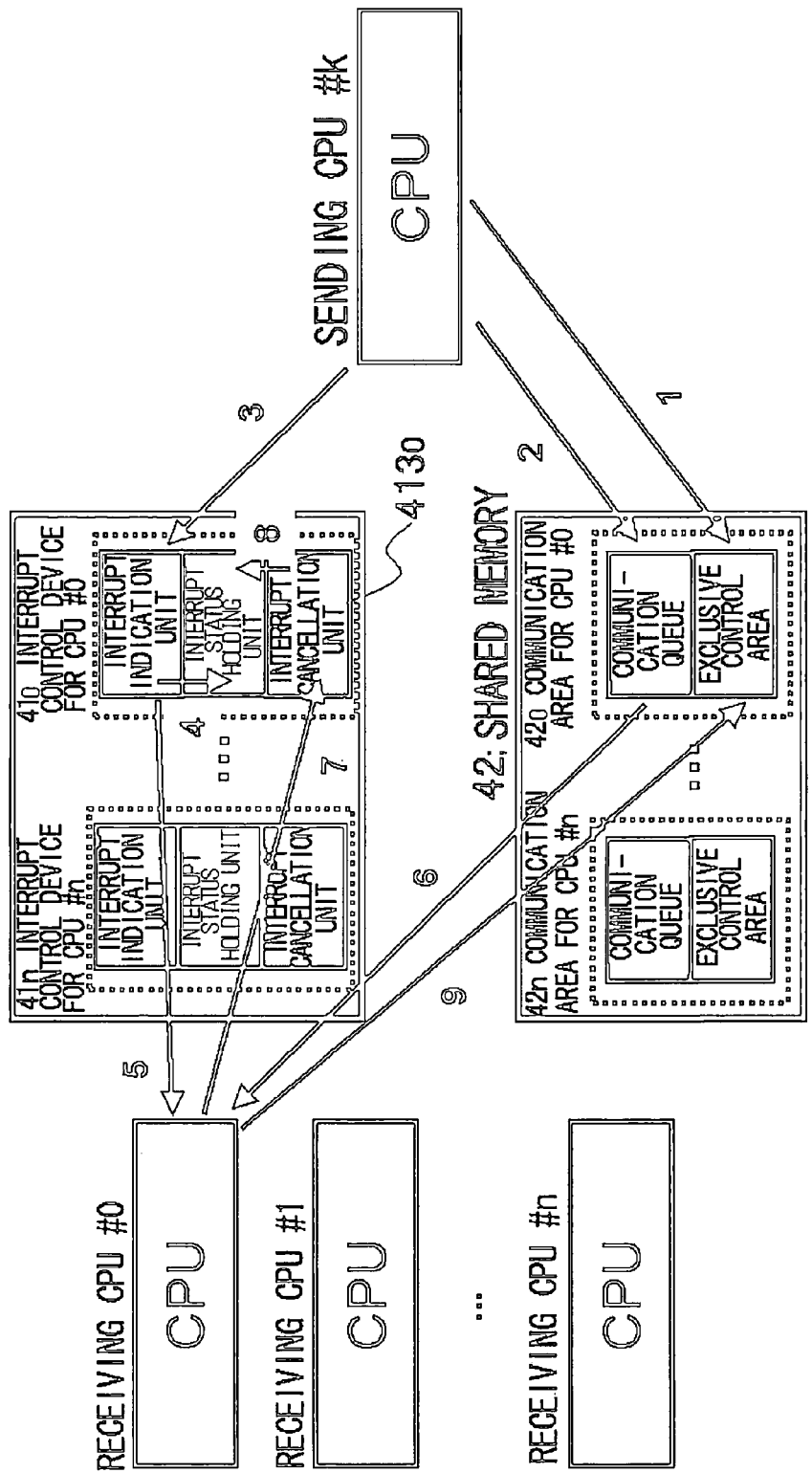
FIG. 3 is a diagram showing the operation of the inter-processor communication means in one embodiment of the present invention.

FIG. 3 is a diagram showing the operation procedure of the inter-processor communication means in this embodiment shown in FIG. 2 in which the procedure for send data from CPU#k to CPU#0 is shown. In FIG. 3, the number beside an arrow indicates the step number.

Step 1: The sending CPU#k locks the exclusion control area of the communication area for CPU#0 in the shared memory 42. If the exclusion control area of the communication area for CPU#0 in the shared memory 42 indicates that it has been locked by some other CPU, the sending CPU#k waits until the lock is released.

Step 2: After locking the exclusion control area in the communication area for CPU#0 in the shared memory 42, the sending CPU#k writes data, which will be sent to the receiving CPU#0, in the communication queue in the communication area for CPU#0 in the shared memory 42.

Step 3: The sending CPU#k sends an interrupt request notification to the interrupt indication unit of the interrupt control device for CPU#0 in the interrupt control device 41.

Step 4: The interrupt indication unit of the interrupt control device for CPU#0 updates the interrupt status holding unit of the interrupt control device for CPU#0 and sets "interrupt request received" therein.

Step 5: The interrupt indication unit of the interrupt control device for CPU#0 sends an interrupt to the receiving CPU#0.

Step 6: The receiving CPU#0 accepts the interrupt from the interrupt indication unit of the interrupt control device for CPU#0 and takes data out from the communication queue in the communication are a for CPU#0 in the shared memory 42. At this time, the interrupt service routine described above performs processing in the receiving CPU#0.

Step 7: After acquiring data from the communication queue in the communication area for CPU#0 in the shared memory 42, the receiving CPU#0 notifies the interrupt cancellation unit of the interrupt control device for CPU#0 that the interrupt processing is completed.

Step 8: The interrupt cancellation unit of the interrupt control device for CPU#0, which has received the interrupt processing completion notification from the receiving CPU#0, updates the interrupt status holding unit of the interrupt control device for CPU#0.

Step 9: The receiving CPU#0 unlocks the exclusion control area in the communication area for CPU#0 in the shared memory 42.

If interrupt requests are sent intensively to a particular receiving CPU in this embodiment, it is possible to perform flow control or bandwidth control, for example, to control the number of interrupts requests that are sent to the receiving CPU. That is, the QoS guarantee function may be provided in the interrupt control device 41 to prevent the sending CPU side from sending interrupt requests to the receiving CPU continuously and frequently. For example, an interrupt request that does not involve the passage of data to the receiving CPU is not exclusively controlled and so such an interrupt request may be issued continuously. To prevent this, if an interrupt request is generated from the sending CPU side before the receiving CPU side does not complete the interrupt processing and the number of "interrupt request received" indications in the interrupt status holding unit of the interrupt control device 41 exceeds a predetermined number, control may be performed to deny the subsequent interrupt requests from the sending CPU side. This configuration prevents an attack that results in performance deterioration in the receiving CPU caused by the sending CPU generating a large number of interrupt requests, each of which is not accompanied with the passage of data to the receiving CPU.

Figure 4:
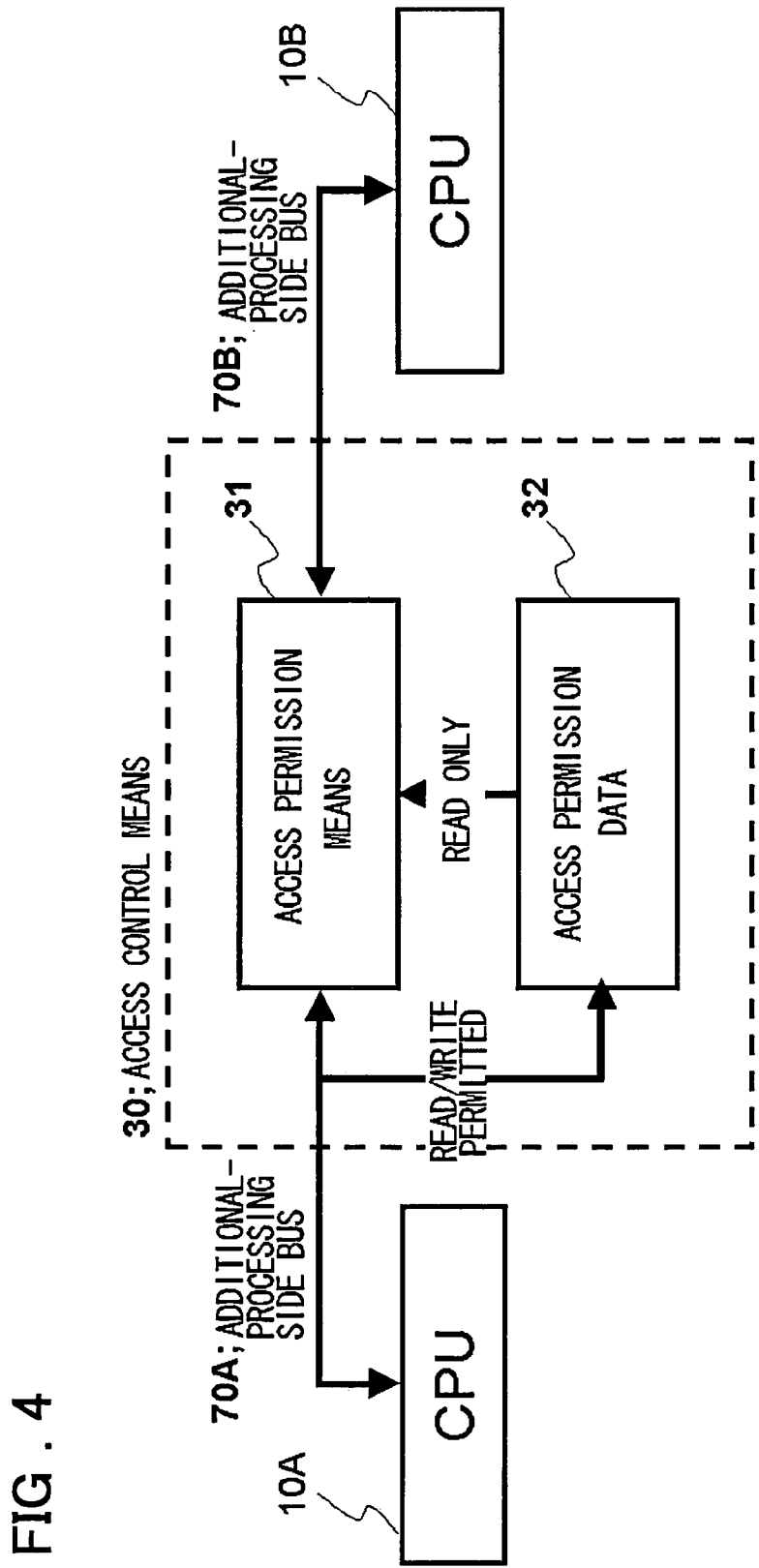
FIG. 4 is a diagram showing the configuration of access control means in one embodiment of the present invention.

FIG. 4 is a diagram showing the configuration of the access control means 30 in one embodiment of the present invention shown in FIG. 1. Referring to FIG. 4, the access control means 30 comprises access permission means 31 that is connected via a basic-processing side bus 70A to the CPU 10A that executes the basic processing (22 in FIG. 1) and is connected via an additional-processing side bus 70B to the CPU 10B that executes additional processing (23 in FIG. 1) and storage means in which access permission data 32 is stored.

The access permission data 32 can be read and written by the CPU 10A. The access permission data 32 can only be read by the access permission means 31. The access permission data 32 can be neither read nor written by the CPU 10B. That is, there is no data path between the access permission data 32 and the CPU 10B.

The access permission means 31, based on the access address signal and the control signal (access command) to the memory 50 (see FIG. 1), which are transferred on the address signal line and the control signal line of the additional-processing side bus 70B, identifies the access type (read/write) and then refers to the information in the access permission data 32 to determine whether the access is valid. If it is found as a result of the determination that the access is invalid, the access permission means 31 does not send the access address and the control signal (access command) to the basic-processing side bus 70A to prevent the CPU 10B side from accessing the basic-processing side bus 70A. In this case, the CPU 10B side which has sent the access address to the additional-processing side bus 70B, finds that the access has failed, because of an occurrence of a bus error or getting no response from the memory 50 or the like for the read/write access.

When the input/output device (I/O) 60 is a memory mapped I/O, the access permission means 31 monitors the additional-processing side bus 70B. If it is found that the access address is an address corresponding to the I/O device and that an I/O command (read/write) is on the data bus, the access permission means 31 references the information in the access permission data 32 to determine if the access is valid. Even if the I/O device is not a memory-mapped I/O, the access permission means 31 decodes the device number of an input/output device and the I/O command transferred to the additional-processing side bus 70B and references the information in the access permission data 32 to determine if the access is valid.

In this embodiment, the access control means 30 may further comprise bandwidth restriction means that controls the data transfer amount per unit time. For example, the access control means 30 comprises means that measures and monitors the amount of data transferred from the CPU 10B to the additional-processing side bus 70B during the access operation of the CPU 10B. For example, if the number of bytes of data transferred per unit time exceeds a predetermined threshold value, the data transfer from the CPU 10B to the CPU 10A may be stopped. In this case, even if the CPU 10B finds that the data transfer to the CPU 10A has failed and retries t h e data transfer, the access control means 30 does not transfer data from the CPU 10B to the CPU 10A. Alternatively, the access control means 30 may further comprises a buffer to allow data, transferred from the CPU 10B to the additional-processing side bus 70B, to be accumulated in the buffer to control the flow amount of data transferred to the CPU 10A.

FIG. 5 is a diagram showing an example of the access permission data 32 in one embodiment of the present invention. Referring to FIG. 5, the access permission data contains the following data in the tabular format: CPU that executes additional processing (CPU connected to the additional-processing side bus in FIG. 4), permission range address composed of the start address and the end address of the range in which access is permitted, and type of permitted access (read, read/write, write). Note that the permission range addresses may overlap between different CPUs. In the example shown in FIG. 5, the permission range address of CPU#2 and CPU#3 in the second row is 0xC000000 to 0xF000000 and the access type is read/write (R/W) indicating that data may be read and written, and the permission range address of CPU#3 in the third row is 0xE000000 to 0xF000000 which overlaps with that in the second row. As the number of pieces of address permission data, that is, the number of table entries, increases, the access control becomes finer. Although R (read enabled), W (write enabled), and R/W (read/write enabled) are shown in FIG. 5 for the sake of description, R/W is not necessary when R (read enabled) means that only the read operation is enabled but the write operation is disabled and W means that the write operation is enabled (the read operation is also enabled). An address range in which read is disabled (write is also disabled) is not stored in the access permission data 32. Although the access permission data in the example in FIG. 5 includes the address range and the access type for each of access-permitted CPUs, the access permission data may further include another access type, that is, access inhibition information, for storing an address range which cannot be accessed by a CPU that executes additional processing.

The access permission means 31 in FIG. 4 receives an access request (address, read/write command) from the CPU on the additional-processing side, references the permission range address and the access type stored in the access permission data 32 and, if the access is permitted, permits the access. On the other hand, if the access is not permitted, the access permission means 31 inhibits the access. In the example shown in FIG. 5, CPU#4 can access the range from the start address 1000 to the end address 2000 (hexadecimal) and the access type is read (R). CPU#2 and CPU#3 can access the range from the start address 0xC000000 to the end address 0xF000000 (hexadecimal) and the access type is read/write (R/W). CPU#3 can access the range from the start address 0xE000000 to the end address 0xF000000 (hexadecimal) and the access type is write (W).

Figure 6:
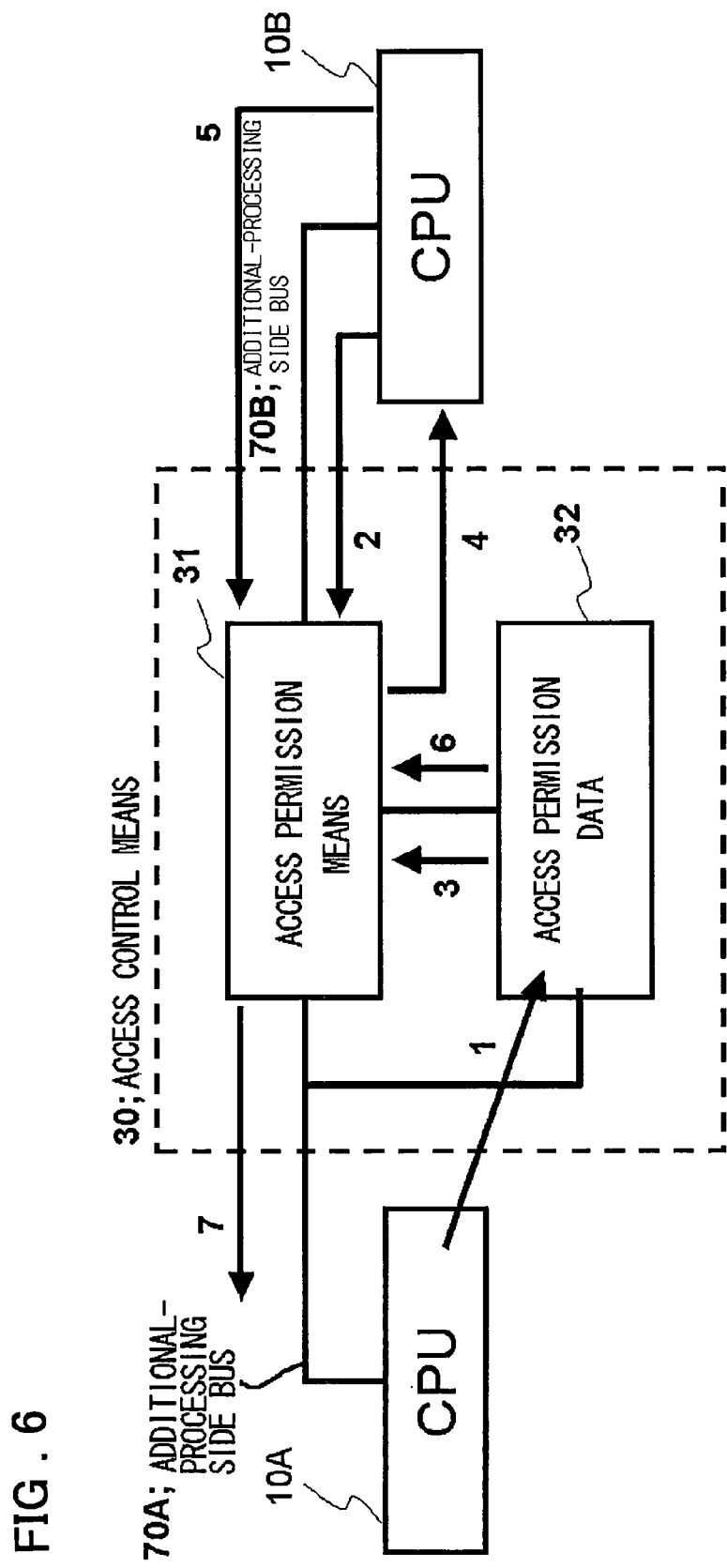
FIG. 6 is a diagram showing the operation of the access control means in one embodiment of the present invention.

FIG. 6 is a diagram showing an example of the operation of the access control means 30 in FIG. 4. In FIG. 6, the number beside an arrow indicates the step number.

Step 1: The CPU 10A, which executes basic processing, stores information in the access permission data 32 of the access control means 30 to inhibit the CPU 10B, which executes all additional processing, from reading data from an address range.

Step 2: Assume that the CPU 10B executes the additional processing 23 and issues a read request to read data from the address range for which read is inhibited.

Step 3: The access permission means 31 reads the access permission data 32 to check if the access request is valid.

Step 4: The access permission means 31 returns an error to the CPU 10B. This is because the CPU 10B is inhibited from reading data from the address range.

Step 5: The CPU 10B issues a read request to read data from a range different from the address range described above.

Step 6: The access permission means 31 reads the access permission data 32 for checking the read request.

Step 7: The access permission means 31 permits the read access request from the CPU 10B and issues the request to the basic-processing side bus 70A as a read request.

In the example in this embodiment, the access control means 30 comprises the access permission means 31 and the access permission data 32 and, based on the access permission information, performs access control. The present invention is not limited only to this configuration. With the change (inversion) of access permission data, there may be provided access rejection data and access rejection means. In this case, if an access address sent from the CPU 10B that executes additional processing matches access rejection data, that is, an address range for which access rejection is defined, the access rejection means rejects the access.

As a modification of this embodiment, the access permission means 31 may have a cache. In this case, the access addresses and access permission data used for checking the validity of access are stored in the cache. In the next and the following access control checking, a check is made to see if the access permission data on the access addresses (access range) is stored in the cache and, if a cache hit occurs, the data in the cache is used to speed the access validity check. The cache comprises a tag address and access permission data corresponding to the range of accessed addresses and further comprises the cache hit checking circuit that checks whether the access address specified by the additional-processing side bus 70B hits an entry in the cache.

Figure 26:
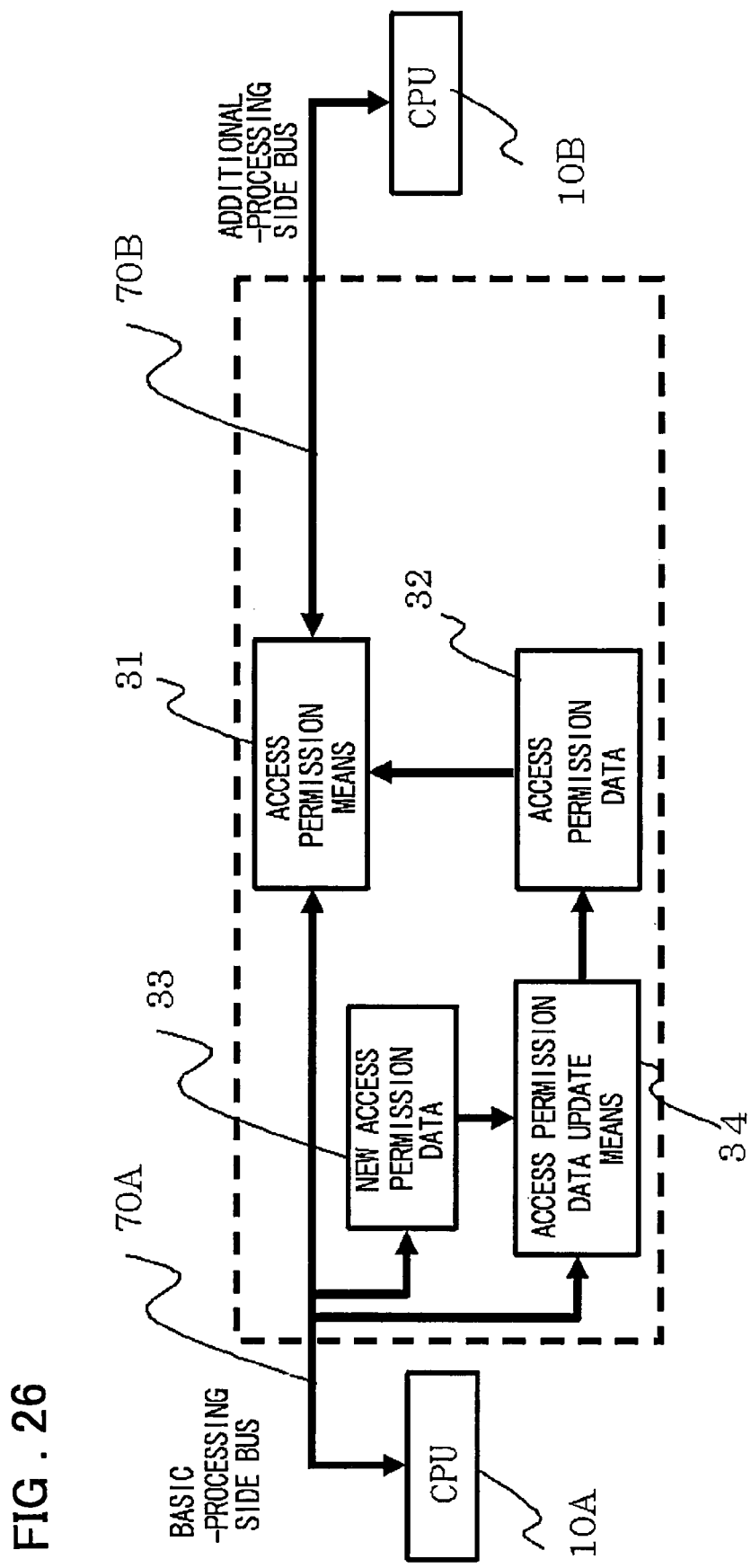
FIG. 26 is a diagram showing an example of trust levels in one embodiment of the present invention.

As another modification of this embodiment, the access control means may comprise new access permission data 33 and access permission data update means 34 as shown in FIG. 26. Referring to FIG. 26, the access control means 30 further comprises the access permission data update means 34, connected to the basic-processing side bus 70A, and storage means, in which the new access permission data 33 is stored, in addition to the embodiment shown in FIG. 4. The following describes the function of those two means in detail.

The new access permission data 33, similar in the characteristics to the access permission data 32 shown in FIG. 4, is storage means from which only the access permission data update means 34 can read data.

In response to a request from the CPU 10A via the basic-processing side bus 70A, the access permission data update means 34 writes the contents of the new access permission data 33 atomically over the new access permission data 34.

In this embodiment, means may also be provided, not for updating the access permission data, but for switching to the new access permission data.

This configuration allows the CPU to update the access permission data 32 by atomically rewriting it, thus enabling the area that is protected and limited by the access control means to be changed dynamically.

Figure 27:
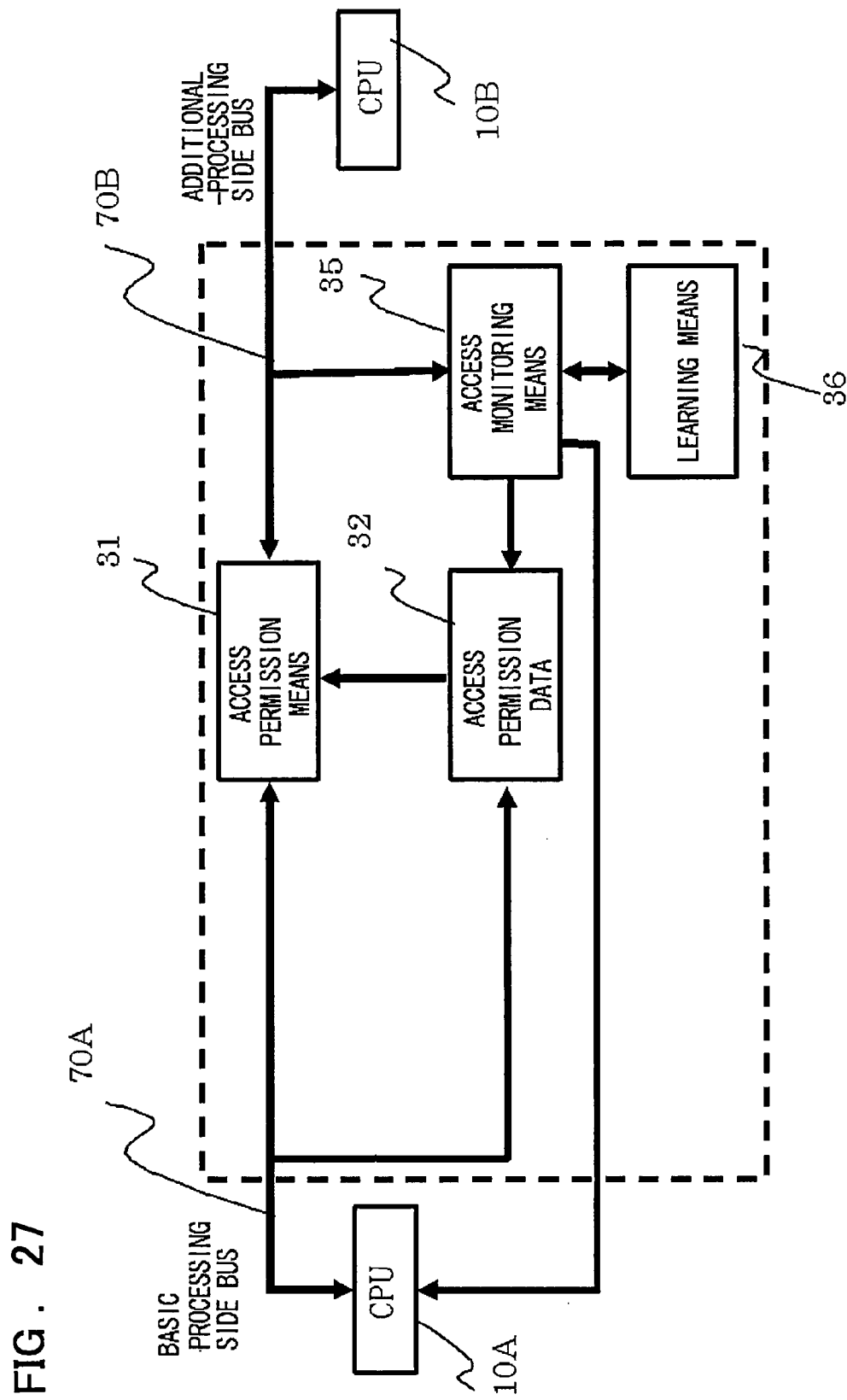
FIG. 27 is a diagram showing an example of trust levels in one embodiment of the present invention.

FIG. 27 is a diagram showing another configuration of the access control means 30 in one embodiment of the present invention. Referring to FIG. 27, this access control means 30 further comprises access monitoring means 35 and learning means 36, connected to the additional-processing side bus 70B, in addition to those components in the embodiment shown in FIG. 4. The following describes the function of this means in detail.

The access monitoring means 35 acquires access information from the CPU 10B via the additional-processing side bus 70B in the same way the access permission means 31.

The learning means 36 stores access information provided by the access monitoring means 35. The learning means 36 checks if the reference is valid based on the access information. For example, the learning means 36 counts the number of references to the user protection data and, if the predetermined threshold is exceeded, determines that an abnormal condition has occurred and notifies the access monitoring means 35 about it to dynamically change the access permission data 32 according to the predetermined rule. Alternatively, the learning means 36 may send a notification to the CPU 10A, connected to the basic-processing side bus 70A, to start abnormal-time processing.

This configuration allows the operation history information on the CPU, which is considered less reliable, to be accumulated based on the actually referenced patterns and autonomously limits the access. Therefore, the execution can be controlled more safely based on the CPU operation status in the actual operation.

Furthermore, another configuration of the access control means is also possible in which the access control means comprises all new means described above, that is, new access control means, access permission update means, access monitoring means, and learning means, in addition to the components in the configuration shown in FIG. 4.

Figure 7:
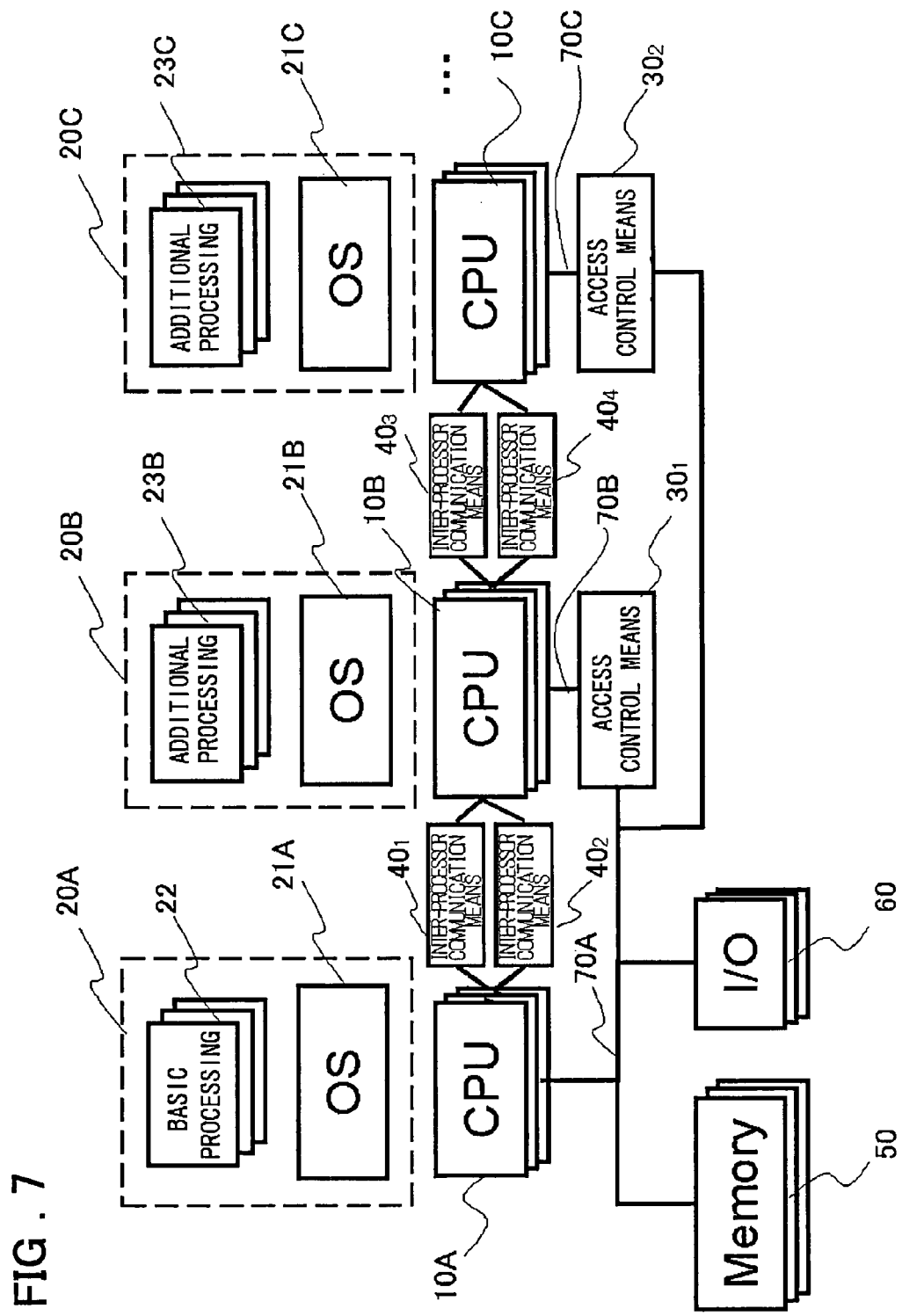
FIG. 7 is a diagram showing the hardware configuration of another embodiment of the present invention.

FIG. 7 is a diagram showing the configuration of another embodiment of the present invention. Referring to FIG. 7, this embodiment has another set of software, an OS, and CPUs on the additional-processing side that is added to the configuration shown in FIG. 1. That is, a CPU 10C on the second additional-processing side communicates with a CPU 10B for the first additional processing via inter-processor communication means. The CPU 10C on the second additional-processing side is connected to a basic-processing side bus 70A via second access control means 302. In the software 20C, there may well have be provided one or plural items of additional processing (23C) and one or plurality of OSs (21C).

The setting of the access control means 301 and 302 is set up by a CPU 10A that executes basic processing 22. That is, the CPU 10A that executes the basic processing 22 functions as a master processor. The CPU 10A integrally manages a memory 50 and an input/output device (I/O) 60.

The CPU 10C that executes second additional processing 23C communicates with (sends data and commands to) the CPU 10B that executes first additional processing 23B via an inter-processor communication means 403; similarly, the CPU 10B that executes the first additional processing 23B communicates with (sends data and commands to) the CPU 10A that executes basic processing 22 via an inter-processor communication means 401. The CPU 10C that executes the second additional processing 23C makes only permitted access to the memory 50 and the input/output device (I/O) 60 under the supervision of the second access control means 302; similarly, the CPU 10B that executes the first additional processing 23B makes only permitted access to the memory 50 and the input/output device (I/O) 60 under the supervision of the first access control means 301. The access permission data of the first access control means 301 and the second access control means 302 is all set by the CPU 10A. This configuration makes the integrated management possible and allows processing to be passed among CPUs via the inter-processor communication means 40. This embodiment also avoids a direct attack from the additional processing 23B and 23C to the CPU 10A that executes the basic processing 22. That is, as in the embodiment described above, the additional processing 23B and 23C can neither directly invoke the basic processing 22 nor call it as a subroutine. For example, a request to invoke the basic processing 22 is transferred from the CPU 10C, via the CPU 10B, to the CPU 10A via the inter-processor communication means. If the request is sent from a CPU that has no authority, the CPU 10A receives the request but does not accept it (This will be described in detail in the example of the software). In this way, with the hierarchy being provided in privileges for the CPUs on the additional-processing side and the CPU on the basic-processing side and the hardware mechanism, such as the inter-processor communication means 40 and the access control means 30, a direct attack to the basic processing can be avoided. Because the inter-processor communication means 401-404 in this embodiment have the configuration similar to the configuration of the above embodiment shown in FIG. 2 and the access control means 301 and 302 have the configuration similar to that of the above embodiment shown in FIG. 4, the description of the detailed configuration and operation is omitted.

Figure 8:
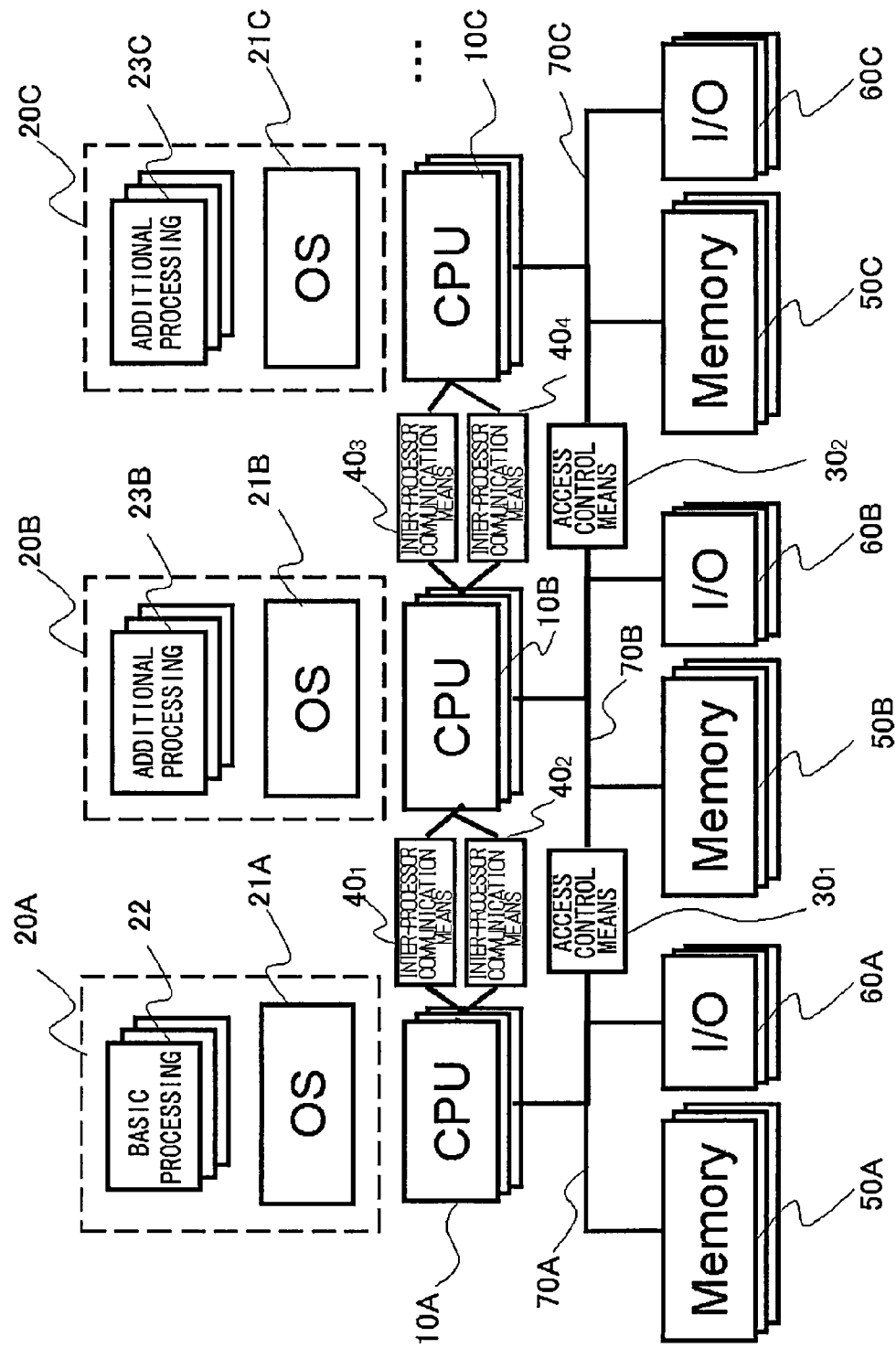
FIG. 8 is a diagram showing the hardware configuration of another embodiment of the present invention.

FIG. 8 is a diagram showing the configuration of another embodiment of the present invention. Referring to FIG. 8, this embodiment has a configuration, similar to that shown in FIG. 7, in which a CPU 10C and access control means 302 on the additional-processing side are provided in addition to the components in the configuration shown in FIG. 1. This embodiment is different from the embodiment shown in FIG. 7 in that a memory and an input/output device (I/O) are provided for each set (domain) of the CPU groups. The second additional-processing CPU 10C can freely access a permitted memory 50C and an input/output device (I/O) 60C with no access limitation. A first additional-processing CPU 10B can access a permitted memory 50B and an input/output device (I/O) 60B with no access limitation.

Access from the CPU 10C on the second additional processing side to a memory 50A and an input/output device (I/O) 60A on the basic-processing side is controlled in the two-stage configuration, that is, via the second access control means 302 and the first access control means 301.

The permission of access from the CPU 10B on the first additional-processing side to the memory 50A and the input/ output device (I/O) 60A on the basic-processing side is determined by the first access control means 301.

The access permission data of the first access control means 301 and the access permission data of the second access control means 302 are set by the CPU 10A that executes the basic processing. The access permission data of the second access control means 302 may also be set by the CPU 10B that executes the first additional processing. This embodiment provides a memory and an I/O device (I/O) separately on a domain basis and connects the CPUs in multiple stages via the inter-processor communication means 40 to increase the function of protection against an attack by the additional processing and thus guarantee security.

Figure 28:
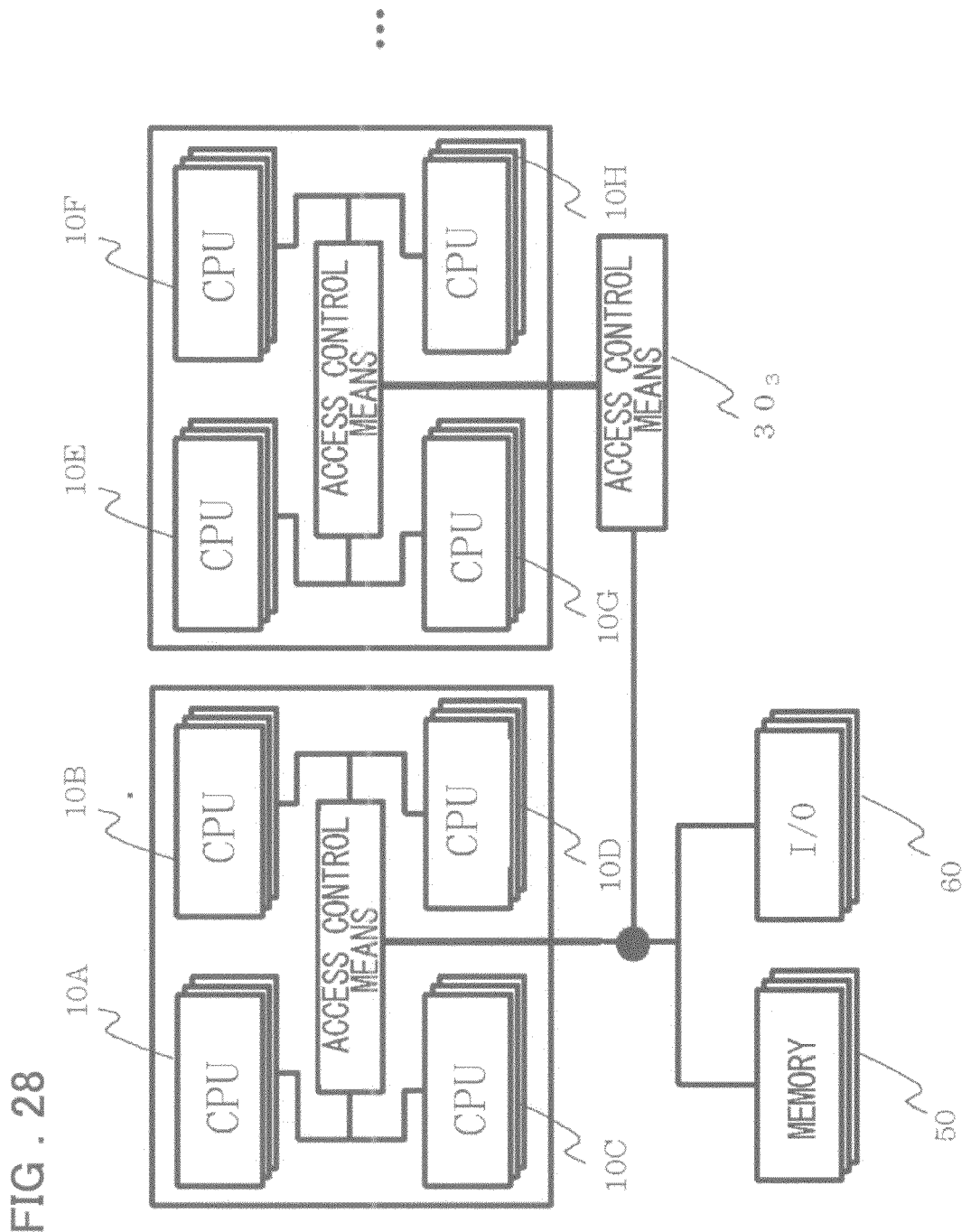
FIG. 28 is a diagram showing an example of trust one embodiment of the present invention.

FIG. 28 is a diagram showing an example in which one embodiment of the present invention shown in FIG. 1 is implemented on two or more chips. Referring to FIG. 28, multiple combinations of the CPUs 10A, 10B, 10C, and 10D and the access control means 301 in one embodiment of the present invention are arranged and, in addition, the chips are connected by access control means 303.

Some CPUs on one chip may be used for executing the basic processing to allow the access control means on one chip to limit access or at least some CPUs on each chip may be used for executing the basic processing.

It is also possible to configure domains across different chips and to control the execution by means of the access control means between the chips.

In either case, the appropriate setup of the access control means allows the execution control of the present invention to be implemented even among multiple chips.

The embodiments described above primarily describe the hardware configuration of the present invention. The following describes the software configuration of the present invention.

Figure 9:
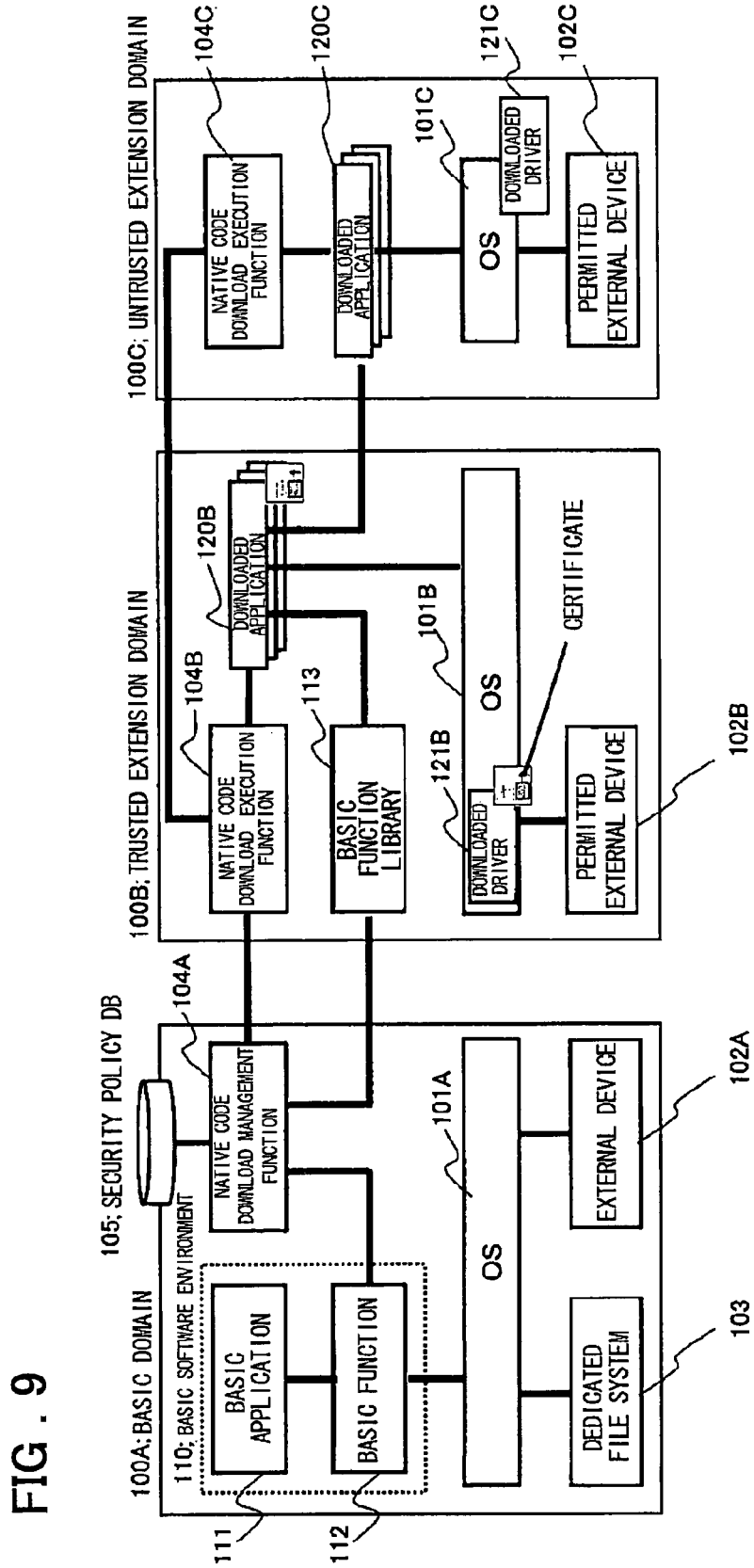
FIG. 9 is a diagram showing the software configuration in one embodiment of the present invention.

FIG. 9 is a diagram showing an example of the software configuration of the present invention in which three domains, that is, basic domain, trusted extension domain, and untrusted extension domain, are provided. The hardware configuration in FIG. 9 is a configuration comprising three groups of CPU, such as that shown in FIG. 8. In this case, the basic domain that has an execution environment in which basic processing is executed corresponds to the software 20A and OS 21A in FIG. 8, the trusted extension domain corresponds to the software 20B and OS 21B in FIG. 8, and the untrusted extension domain corresponds to the software 20C and OS 21C in FIG. 8.

Referring to FIG. 9, a basic domain 100A comprises basic software 110 that includes a basic application program (termed "basic application") 111 and a basic function 112, an OS 101A, a dedicated file system 103, and an external device 102A and further comprises a native code download management function 104A and a security policy database 105. Although not limited thereto, the basic function 112 implements the basic function of a portable information communication terminal, such as call processing including call issuance and reception processing, Internet access, and screen processing, when the information communication device in this embodiment is a portable information communication terminal, and this basic function corresponds to the basic processing 22 in FIG. 1. The basic application 111 calls the basic function 112 for processing, and the basic function 112 accesses the file system and the external device via the OS. The external device includes the communication interface such as the wireless communication interface, the display interface, the input interface such as keys and a pointing device, the SD (Secure Digital) memory card interface, and the sound interface. In the basic domain 110A, there may well be provided one or plurality of OSs (101A), one or plurality of dedicated file systems (103) and one or plurality of external devices (102A). In the basic software 110, there may well be provided one or a plurality of basic applications (111) and one or plural basic functions (112). The same is true for another embodiments described below.

A trusted extension domain 100B comprises a native code download execution function 104B, a downloaded application program (termed "download application") 120B, a basic function library (wrapper) 113, an OS 101B, and a permitted external device 102B.

The OS 101B includes a downloaded driver 121B with a certificate. The downloaded driver 121B with a certificate controls the input/output of the permitted external device 102B. In the trusted extension domain 110B, there may well be provided one or plurality of OSs (101B), one or plurality of permitted external devices (102B), one or a plurality of basic function libraries (113), and one or a plurality of download applications (120C). The s am e is true for another embodiments described below.

An untrusted extension domain 100C comprises a native code download execution function 104C, a downloaded application 120C, an OS 101C, and a permitted external device 102C. A downloaded driver 121C embedded in the OS 101C controls the input/output of the permitted external device 102C. In the untrusted extension domain 110C, there may well be provided one or plurality of OSs (101C), one or plurality of permitted external devices (102C), and one or a plurality of download applications (120C). The same is true for another embodiments described below.

The native code download management function 104A references the contents of the security policy database 105 to check a file that is input and downloaded from the external device 102A of the basic domain 100A. Then, the native code download management function 104A transfers a trusted (with trusted electronic certificate) native code application to the trusted extension domain 100B and includes a trusted (with trusted electronic certificate) native code downloaded driver 121B into the OS 101B.

The native code download management function 104A transfers an untrusted (for example, without electronic certificate or certificate with incorrect contents) application to the untrusted extension domain 100C via the trusted extension domain 100B, and includes an untrusted (without certificate) downloaded driver into the OS 101C of the untrusted extension domain.

The basic function 112 can be called from the trusted extension domain 100B but not from the untrusted extension domain 100C. It is possible for the untrusted extension domain 100C and the trusted extension domain 100B to work together.

An application program running in the trusted domain passes data, received from the untrusted domain, to the basic function 112 only if the user confirms it (OK). The application program does not pass data, received from the untrusted domain, to the basic function 112 without user confirmation. Note that a processing request cannot be issued from the trusted extension domain 100B directly to the basic function 112 of the basic domain 100A.

Figure 10:
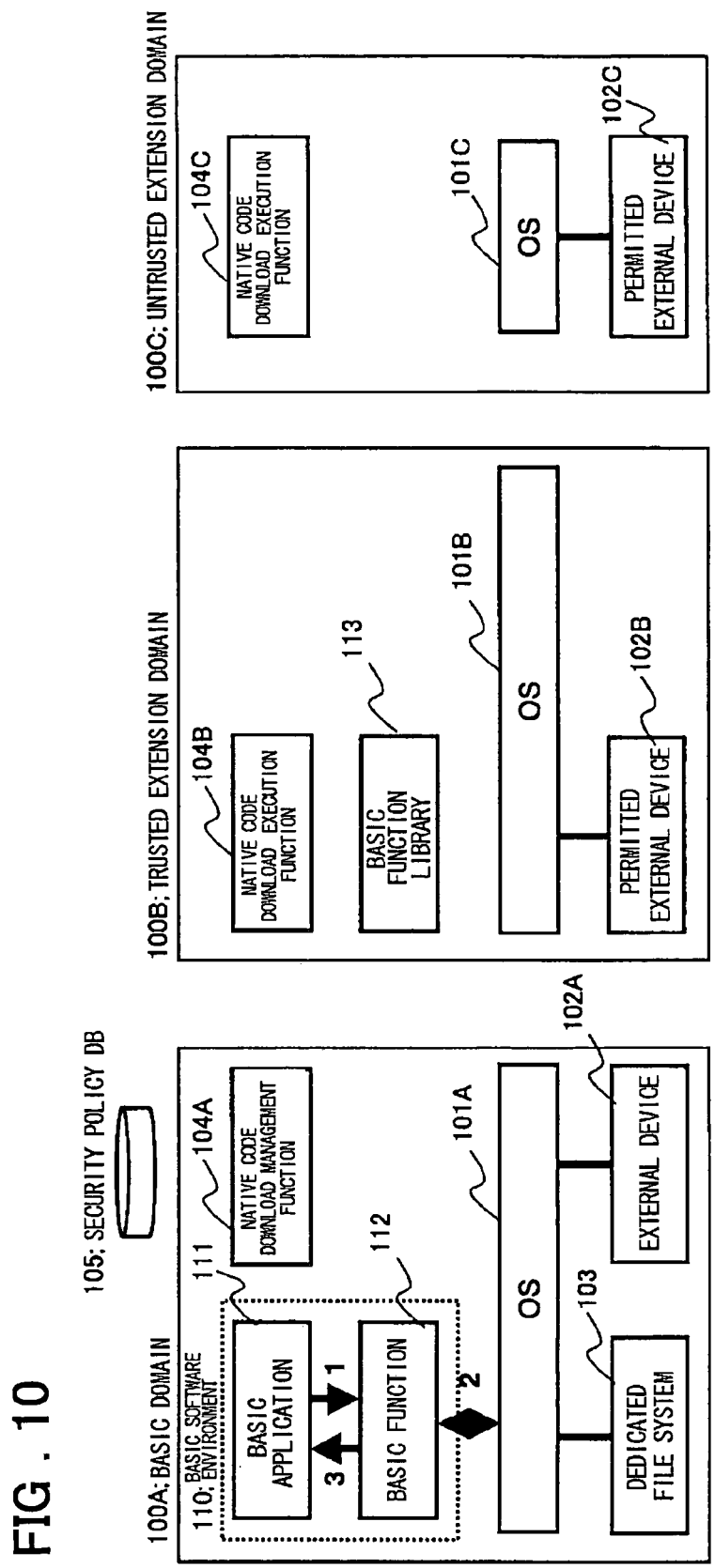
FIG. 10 is a diagram showing the operation of one embodiment of the present invention.

FIG. 10 is a diagram showing the operation of one embodiment of the present invention shown in FIG. 9 and showing the execution of the basic application. In FIG. 10, the number beside an arrow indicates the step number of information transfer corresponding to the line.

Step 1: The basic application 111 in the basic domain 100A issues a processing request (for example, addition of data to an address book) to the basic function 112.

Step 2: The basic function 112 processes the request using OS 101A.

Step 3: The basic function 112 notifies the basic application 111 whether the request is processed successfully.

Figure 11:
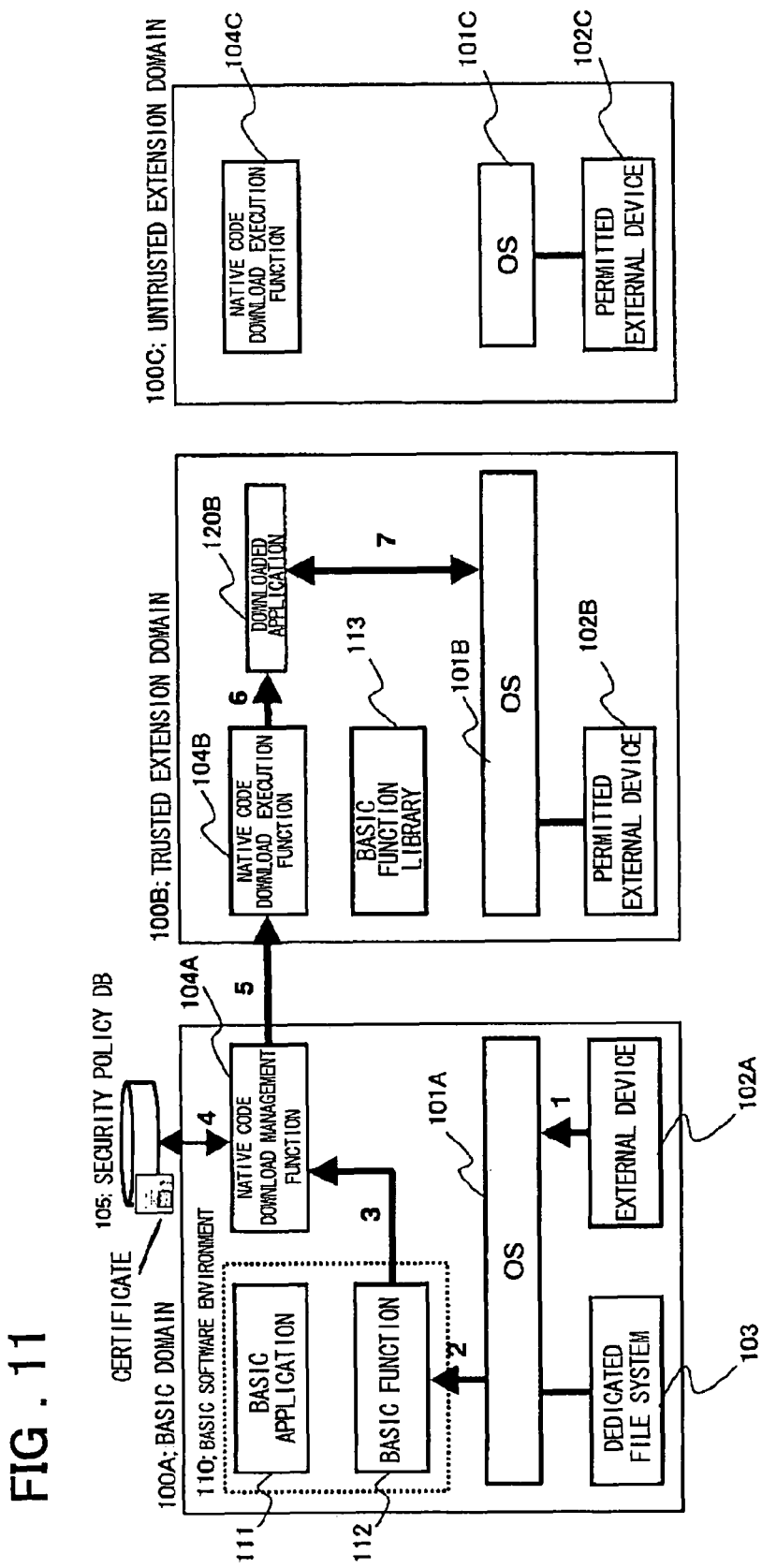
FIG. 11 is a diagram showing the operation of one embodiment of the present invention.

FIG. 11 is a diagram showing the operation of one embodiment of the present invention shown in FIG. 9 and showing how a trusted application is downloaded. In FIG. 11, the number beside an arrow indicates the step number of information transfer corresponding to the line.

Step 1: Downloaded data arrives from the external device 102A (network, SD card memory, etc) in the basic domain 100A to the OS 101A.

Step 2: The downloaded data is recognized by the basic function 112 as an additional application (downloaded application) based on the information such as the attribute information.

Step 3: The basic function 112 passes the additional application to the native code download management function 104A, and the native code download management function 104A references the security policy database 105 to check the electronic certificate attached to the additional application. As described above, the electronic certificate stores a public key and a digital signature (generated by encrypting the certifying organization or the public key with the private key). When the native code download management function 104A authenticates the certificate, it decrypts the digital signature with the public key and checks if the decrypted data matches the content of data in the certificate and, if they match, determines that the data in the certificate is trusted. In addition, by providing a digital signature composed of the digest of the application, it is possible to check whether or not the downloaded application is altered.

Step 4: The native code download management function 104A saves the electronic certificate and the downloaded information in the security policy database 105.

Step 5: If the checking result of the electronic certificate indicates that it is valid, the native code download management function 104A in the basic domain 100A sends the downloaded application to the native code download execution function 104B in the trusted extension domain 100B and requests it to execute the downloaded application. The transmission of data from the native code download management function 104A in the basic domain 100A to the native code download execution function 104B in the trusted extension domain 100B is performed by the inter-processor communication means 40 shown in FIG. 7 or FIG. 8.

Step 6: The native code download execution function 104B in the trusted extension domain 100B controls the operation so that the received downloaded application is executed.

Step 7: The downloaded application is executed in the trusted extension domain.

Figure 12:
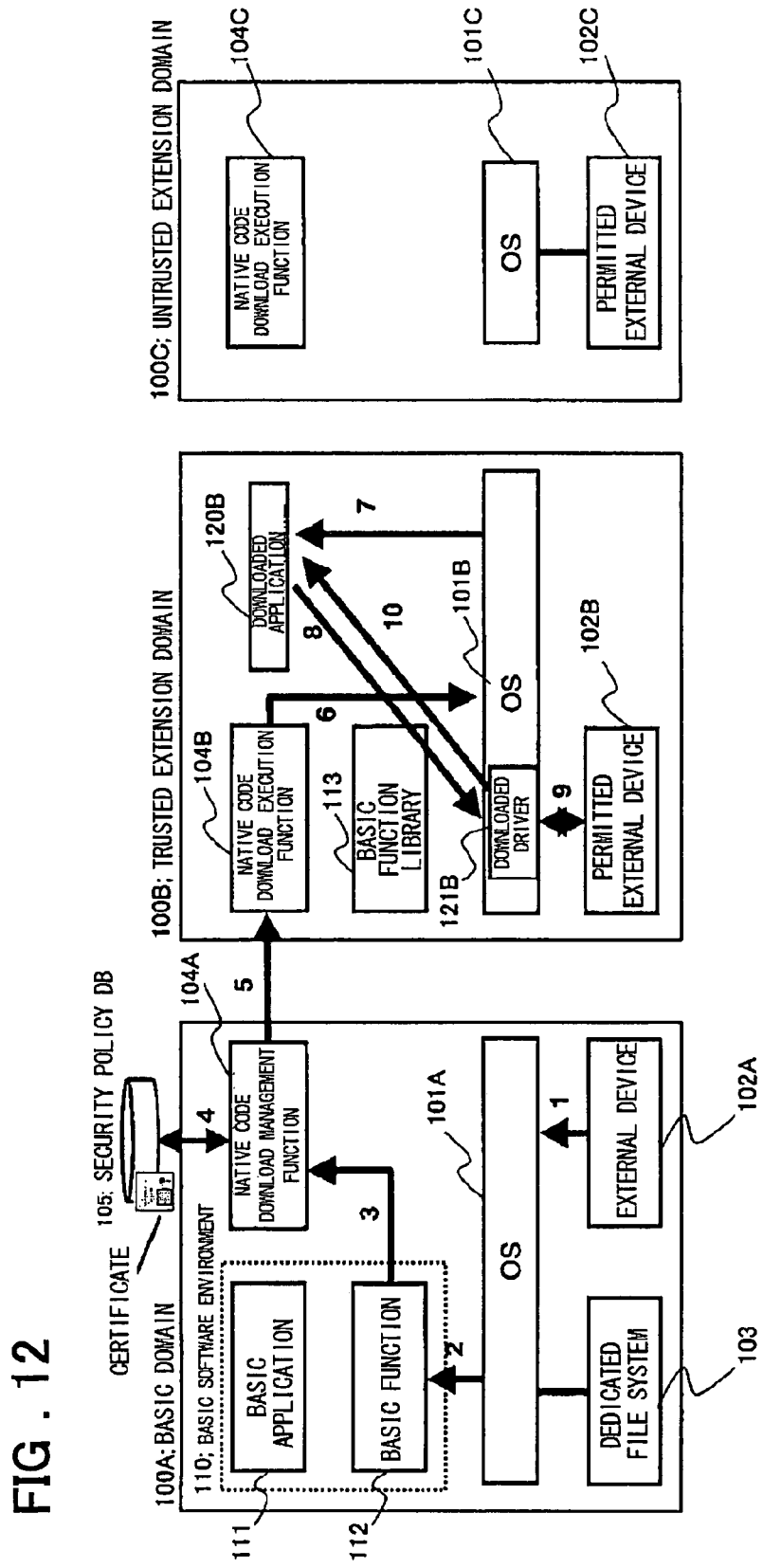
FIG. 12 is a diagram showing the operation of one embodiment of the present invention.

FIG. 12 is a diagram showing the operation of one embodiment of the present invention shown in FIG. 9 and showing the download execution of a trusted driver. A trusted driver refers to a driver whose electronic certificate, attached to the downloaded driver, is successfully checked. In FIG. 12, the number beside an arrow indicates the step number of information transfer corresponding to the line.

Step 1: The downloaded data arrives from the external device 102A (network or SD card) in the basic domain 100A to the OS 101A.

Step 2: The basic function 112 recognizes that the downloaded data is an additional device driver (downloaded driver) based on attribute information, the automatic installation information, and so on.

Step 3: The basic function 112 passes the received driver to the native code download management function 104A. The native code download management function 104A references the security policy database 105 to check the electronic certificate attached to the downloaded data.

Step 4: The native code download management function 104A saves the electronic certificate and the downloaded information in the security policy database 105.

Step 5: The native code download management function 104A sends the downloaded driver to the native code download execution function 104B in the trusted extension domain and requests it to execute the installation. The transmission of data from the native code download management function 104A in the basic domain 100A to the native code download execution function 104B in the trusted extension domain 100B is performed by the inter-processor communication means 40 shown in FIG. 7 or FIG. 8.

Step 6: The native code download execution function 104B in the trusted extension domain automatically installs the received downloaded driver. Although not limited thereto, the downloaded driver in this embodiment may be a resident-type driver that is installed and, after the CPU is restarted, included into an area of the OS 101B.

Step 7: The OS 101B in the trusted extension domain notifies an already-executed application that the downloaded driver is installed or displays a message about it.

Step 8: In the trusted extension domain, the already-executed application 120B references the downloaded driver 121B that is installed.

Step 9: The downloaded driver 121B, installed in the OS 101B in the trusted extension domain and loaded, accesses the permitted external device 102B.

Step 10: The downloaded driver 121B returns data, received from the external device 102B, to the downloaded application program 120B.

Figure 13:
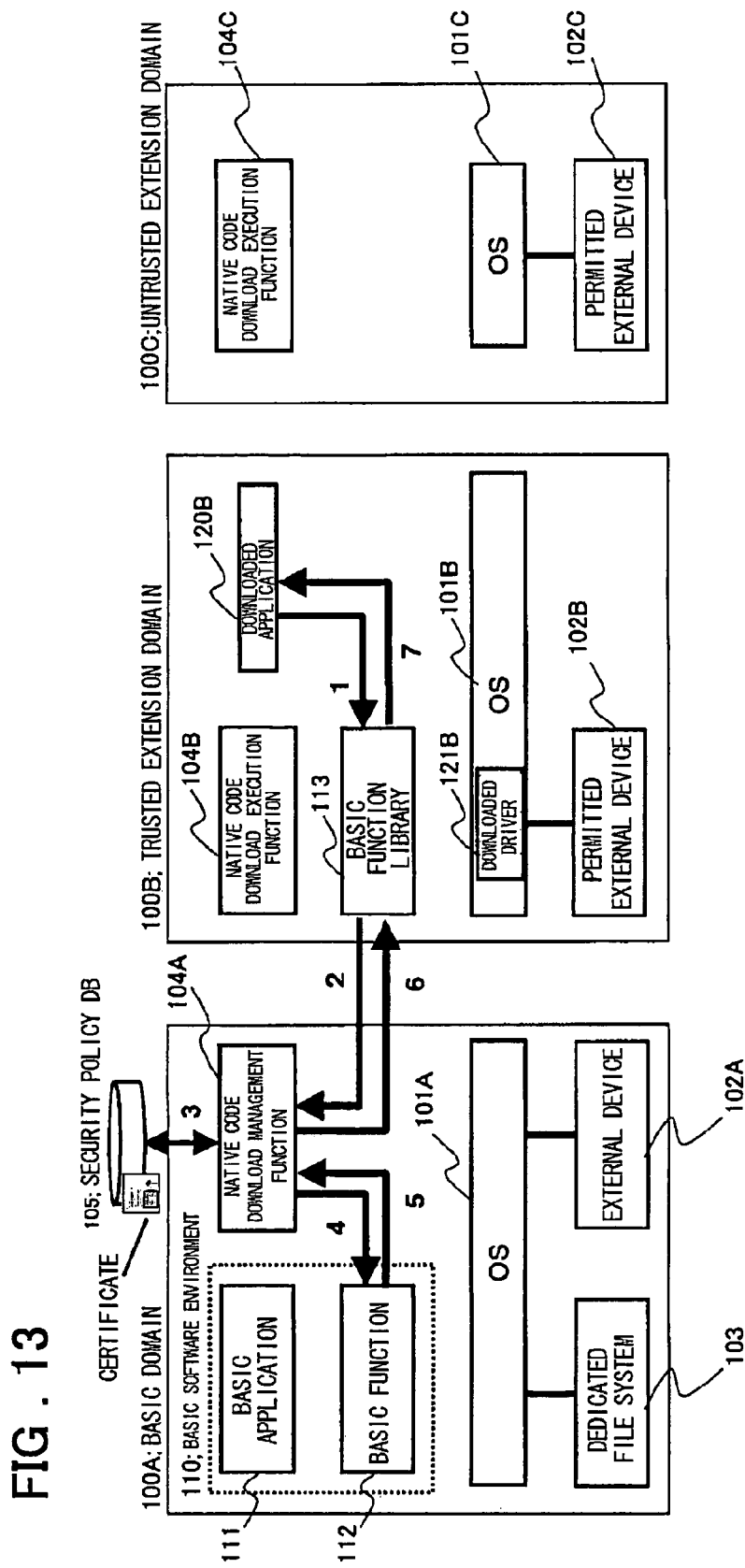
FIG. 13 is a diagram showing the operation of one embodiment of the present invention.

FIG. 13 is a diagram showing the operation of one embodiment of the present invention shown in FIG. 9 and showing the operation performed when a trusted application (downloaded application) in the trusted extension domain uses the basic function in the basic domain. In FIG. 13, the number beside an arrow indicates the step number of information transfer corresponding to the line.

Step 1: In the trusted extension domain 100B, the downloaded application 120B requests the basic function library 113 to perform the basic function 112 in the basic domain 100A. The basic function library 113, a library in which a collection of the routines for executing the processing of the basic function 112 in the basic domain 100A is stored, is started by the downloaded application 120B.

Step 2: The basic function library 113 in the trusted extension domain 100B uses the key (public key) of the electronic certificate held by the downloaded application 120B to encrypt the request and sends the encrypted request to the native code download management function 104A in the basic domain 100A. The transmission of the request from the basic function library 113 in the trusted extension domain 100B to the native code download management function 104A in the basic domain 100A is performed by the inter-processor communication means 40 shown in FIG. 7 or FIG. 8.

Step 3: The native code download management function 104A in the basic domain 100A decrypts the received request and, using the electronic certificate, checks if the request source of the request is valid. Although the request is checked using the encryption and decryption of the request in this example, it is of course possible to use any method that confirms the correspondence between the application and the electronic certificate.

Step 4: If the checking result of the request indicates that the request is valid, the native code download management function 104A in the basic domain 100A sends the request to the basic function 112.

Step 5: The basic function 112 in the basic domain 100A processes the request passed from the native code download management function 104A and, after the processing is completed, notifies the native code download management function 104A in the basic domain 100A that the processing is completed.

Step 6: The native code download management function 104A in the basic domain 100A notifies the basic function library 113 in the trusted extension domain 100B that the processing is completed. The transmission of the notification from the native code download management function 104A in the basic domain 100A to the basic function library 113 in the trusted extension domain 100B is performed by the inter-processor communication means 40 shown in FIG. 7 or FIG. 8.

Step 7: The basic function library 113 in the trusted extension domain notifies the downloaded application 120B, as a response to the request, that the processing is completed.

Figure 14:
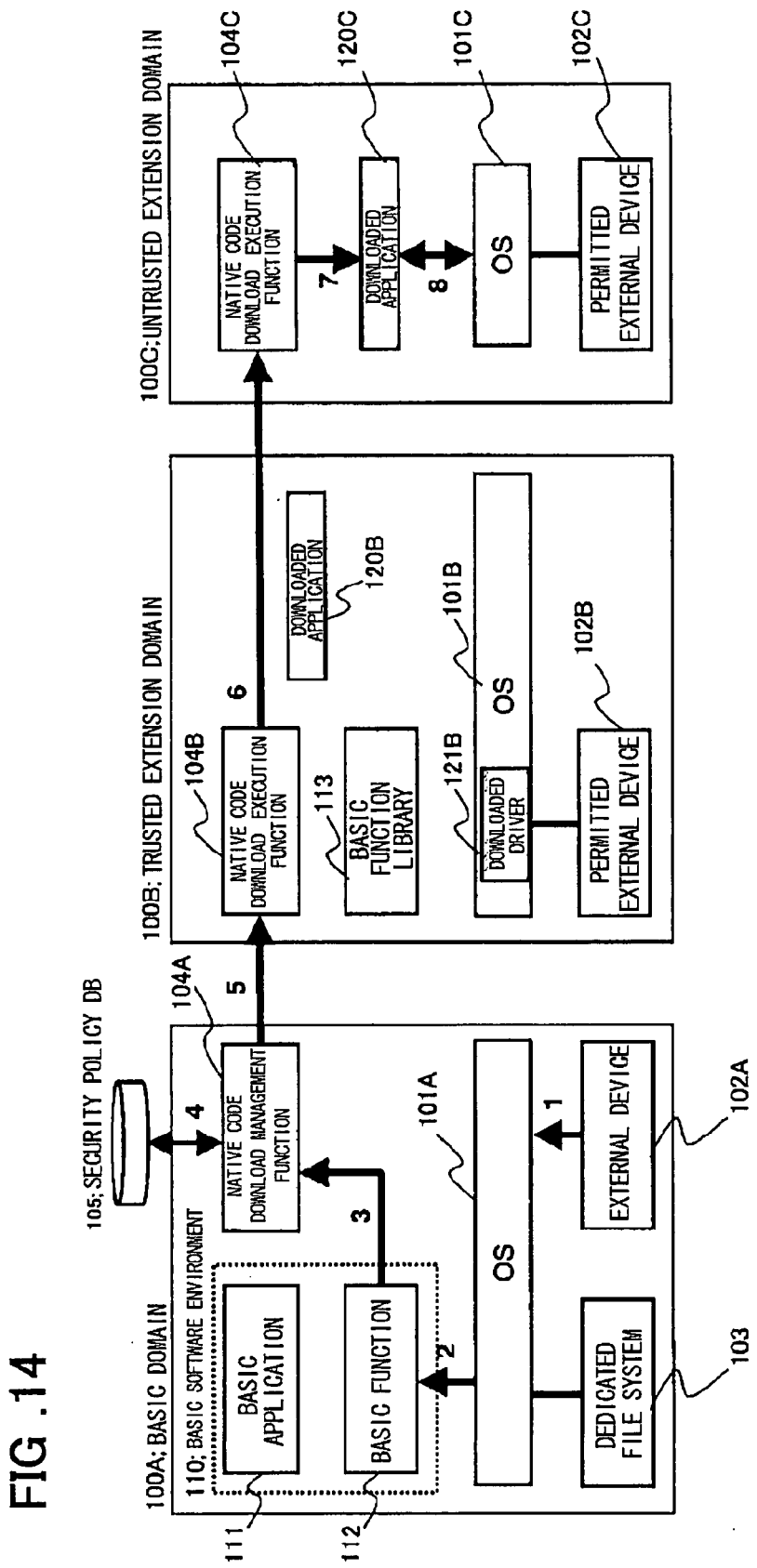
FIG. 14 is a diagram showing the operation of one embodiment of the present invention.

FIG. 14 is a diagram for explaining the operation of one embodiment of the present invention shown in FIG. 9 and showing the execution procedure for downloading an untrusted application in the untrusted extension domain. In FIG. 14, the number beside an arrow indicates the step number of information transfer corresponding to the line.

Step 1: Downloaded data arrives from the external device 102A (network or SD card) in the basic domain 100A to the OS 101A.

Step 2: The basic function 112 in the basic domain 100A analyzes the attribute information and so on and recognizes the downloaded data as an application (downloaded application).

Step 3: The basic function 112 in the basic domain 100A passes the downloaded application to the native code download management function 104A. The native code download management function 104A finds that no electronic certificate is attached to the application or that the electronic certificate is invalid.

Step 4: The native code download management function 104A in the basic domain 100A saves the downloaded information in the security policy database 105.

Step 5: The native code download management function 104A in the basic domain 100A sends the downloaded application to the native code download execution function 104B in the trusted extension domain. The transmission of the application from the native code download management function 104A in the basic domain 100A to the native code download execution function 104B in the trusted extension domain is performed by the inter-processor communication means 40 shown in FIG. 7 or FIG. 8.

Step 6: The native code download execution function 104B in the trusted extension domain 100B sends the application to the native code download execution function 104C in the untrusted extension domain 100C and requests it to execute the application. The transmission of the application from the native code download execution function 104B in the trusted extension domain 100B to the native code download execution function 104C in the untrusted extension domain 100C is performed by the inter-processor communication means 40 shown in FIG. 7 or FIG. 8.

Step 7: The native code download execution function 104C in the untrusted extension domain invokes the received downloaded application 120C.

Step 8: The downloaded application 120C starts the operation in the untrusted extension domain 100C. In this case, the downloaded application 120C in the untrusted extension domain operates on the OS 101C in the untrusted extension domain and is permitted access only to the permitted external device 102C.

Figure 15:
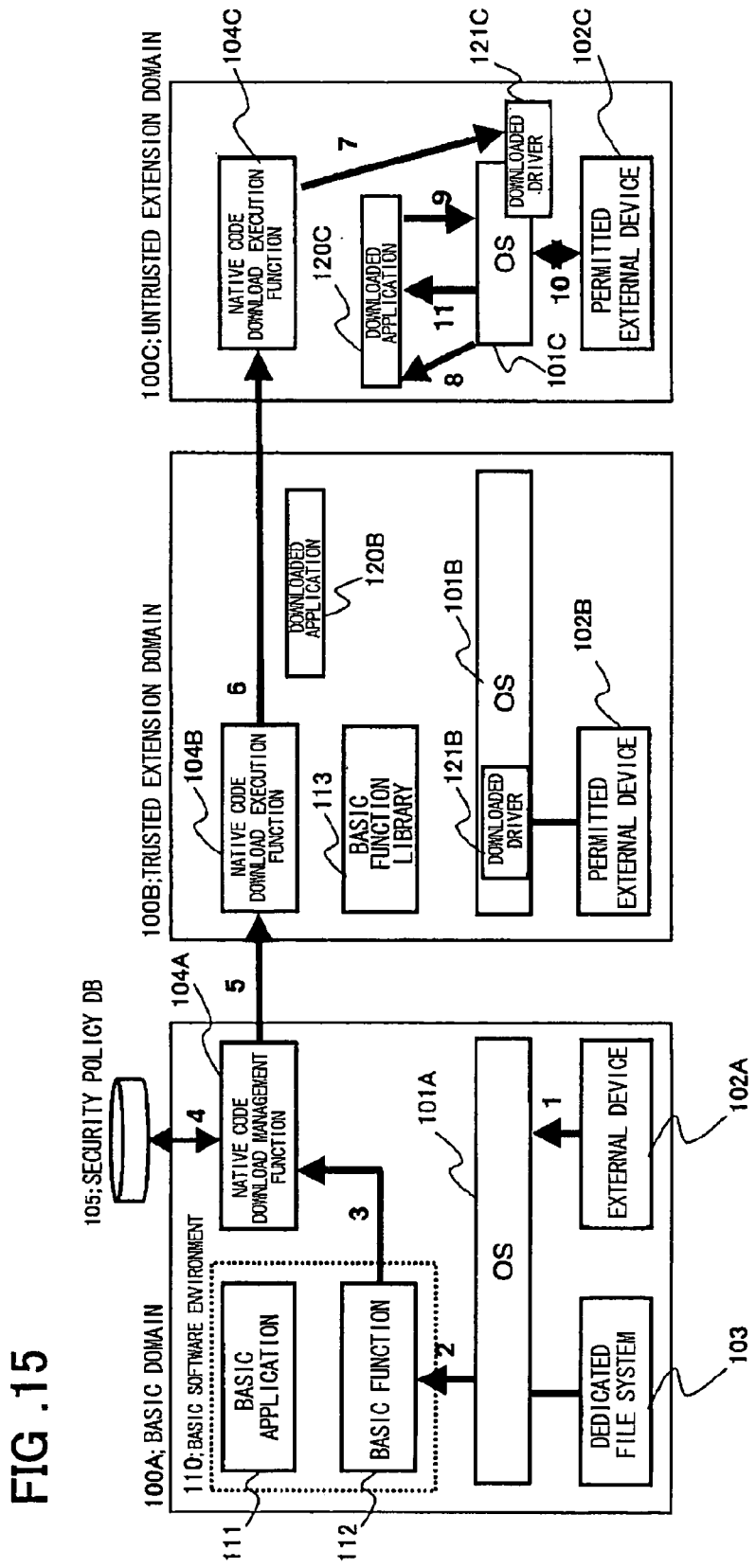
FIG. 15 is a diagram showing the operation of one embodiment of the present invention.

FIG. 15 is a diagram for explaining the operation of one embodiment of the present invention shown in FIG. 9 and showing the download execution of an untrusted driver. In FIG. 15, the number beside an arrow indicates the step number of information transfer corresponding to the line.

Step 1: Downloaded data arrives from the external device 102A (network or SD card) in the basic domain 100A to the OS 101A.

Step 2: The basic function 112, which is invoked when the downloaded data arrives, analyzes the download data such as the attribute information, installation information, and so on and recognizes the data as a device driver (downloaded driver).

Step 3: The basic function 112 passes the downloaded driver to the native code download management function 104A, and the native code download management function 104A finds that no electronic certificate is attached to the downloaded driver or that the electronic certificate is attached but the content of the electronic certificate is invalid.

Step 4: The native code download management function 104A in the basic domain 100A saves only the download information in the security policy database 105.

Step 5: The native code download management function 104A sends the downloaded driver to the native code download execution function 104B in the trusted extension domain 100B. The transmission of the downloaded driver from the native code download management function 104A to the native code download execution function 104B in the trusted extension domain 100B is performed by the inter-processor communication means 40 shown in FIG. 7 or FIG. 8.

Step 6: The native code download execution function 104B in the trusted extension domain 100B transfers the received downloaded driver to the native code download execution function 104C in the untrusted extension domain 100C. The transfer of the downloaded driver from the native code download execution function 104B in the trusted extension domain 100B to the native code download execution function 104C in the untrusted extension domain 100C is performed by the inter-processor communication means 40 shown in FIG. 7 or FIG. 8.

Step 7: The native code download execution function 104C in the untrusted extension domain 100C installs the received downloaded driver 121C.

Step 8: The OS 101C notifies an application 120C, which was already executed, that the driver 121C is installed or displays a message about it (notifies the user).

Step 9: In the untrusted extension domain 100C, the application 120C, which was already executed, references the downloaded driver 121C that is installed.

Step 10: In the untrusted extension domain 100C, the downloaded driver 121C, which is installed, accesses the permitted external device 102C via the OS 101C in the untrusted extension domain.

Step 11: In the untrusted extension domain 100C, the downloaded driver 121C returns data, acquired from the external device 102C, to the downloaded application 120C.

Figure 16:
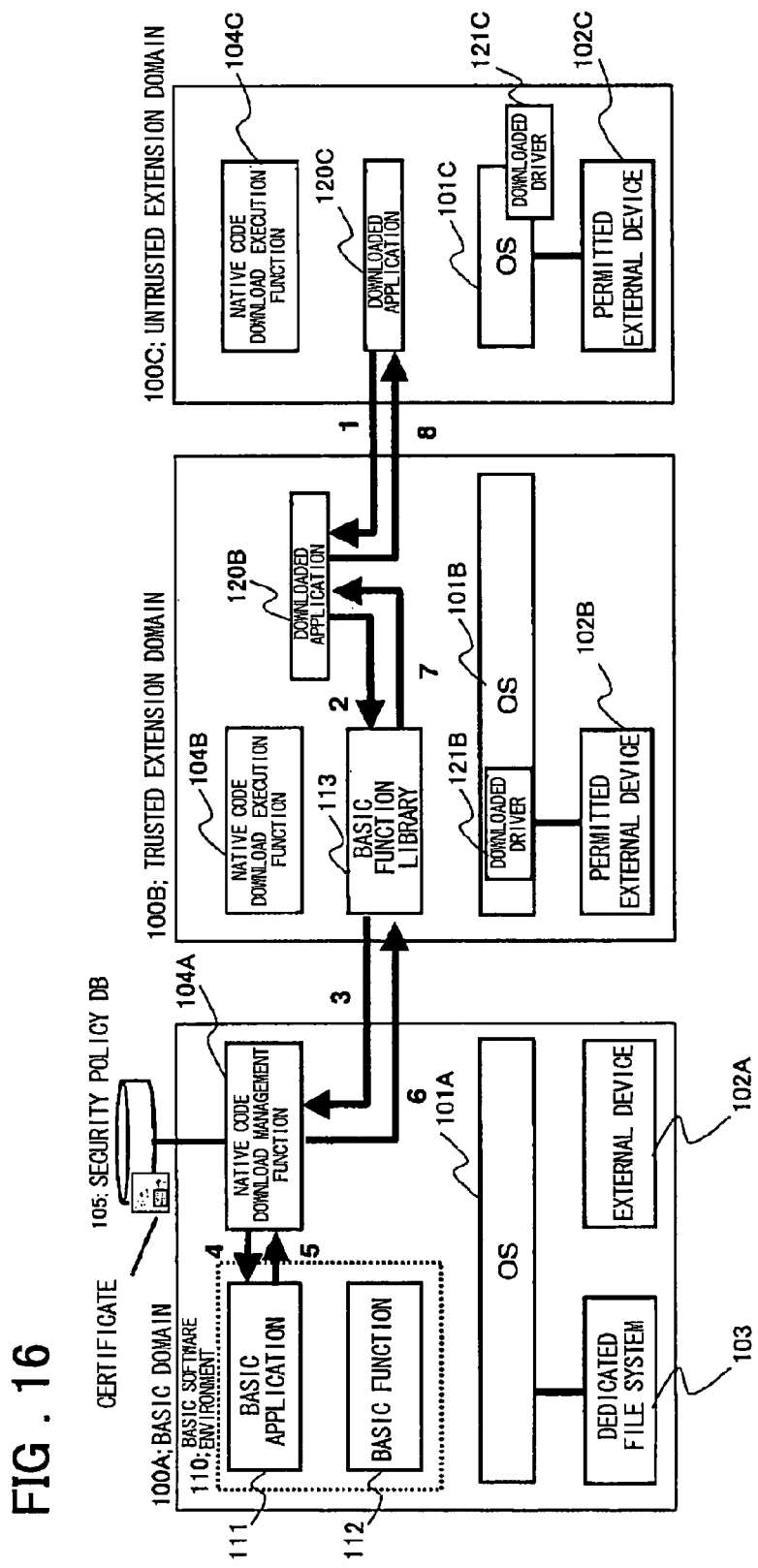
FIG. 16 is a diagram showing the operation of one embodiment of the present invention.

FIG. 16 is a diagram for explaining the operation of one embodiment of the present invention shown in FIG. 9 and showing the cooperation between a trusted application and an untrusted application. In FIG. 16, the number beside an arrow indicates the step number of information transfer corresponding to the line.

Step 1: The downloaded application 120C in the untrusted extension domain 100C sends data to the downloaded application 120B in the trusted extension domain 100B. The transmission of this data is performed usually by the inter-processor communication means 40 shown in FIG. 7 or FIG. 8.

Step 2: The downloaded application 120B in the trusted extension domain 100B performs processing using the received data and requests the basic function library 113 to perform the basic function processing including information associated with the untrusted extension domain.

Step 3: The basic function library 113 in the trusted extension domain 100B encrypts the request using the electronic certificate held by the application and sends the encrypted request to the native code download management function 104A in the basic domain 100A. The transmission of this request is performed usually by the inter-processor communication means 40 shown in FIG. 7 or FIG. 8.

Step 4: The native code download management function 104A in the basic domain 100A decrypts the request and checks the completeness of the request using the electronic certificate stored in the security policy database 105. If the result of checking indicates that the request is valid, the native code download management function 104A requests the user to confirm it via the basic application 111. The basic application 111 includes a screen display/entry application. Although the encryption and decryption of the request are used in this example to check the correspondence between the application and the electronic certificate, it is of course possible to use any method as long as the correspondence between the application and the electronic certificate can be checked.

Step 5: Assume that 'NO' is entered as a confirmation response from the user.

Step 6: The native code download management function 104A notifies the basic function library 113 in the trusted extension domain 100B that the request was not permitted. This no-permission notification is usually sent by the inter-processor communication means 40 shown in FIG. 7 or FIG. 8.

Step 7: The basic function library 113 sends the no-permission notification to the downloaded application 120B.

Step 8: The downloaded application 120B in the trusted extension domain 100B sends the no-permission notification to the downloaded application 120C in the untrusted extension domain 100C. This no-permission notification is sent usually by the inter-processor communication means 40 shown in FIG. 7 or FIG. 8.

Figure 17:
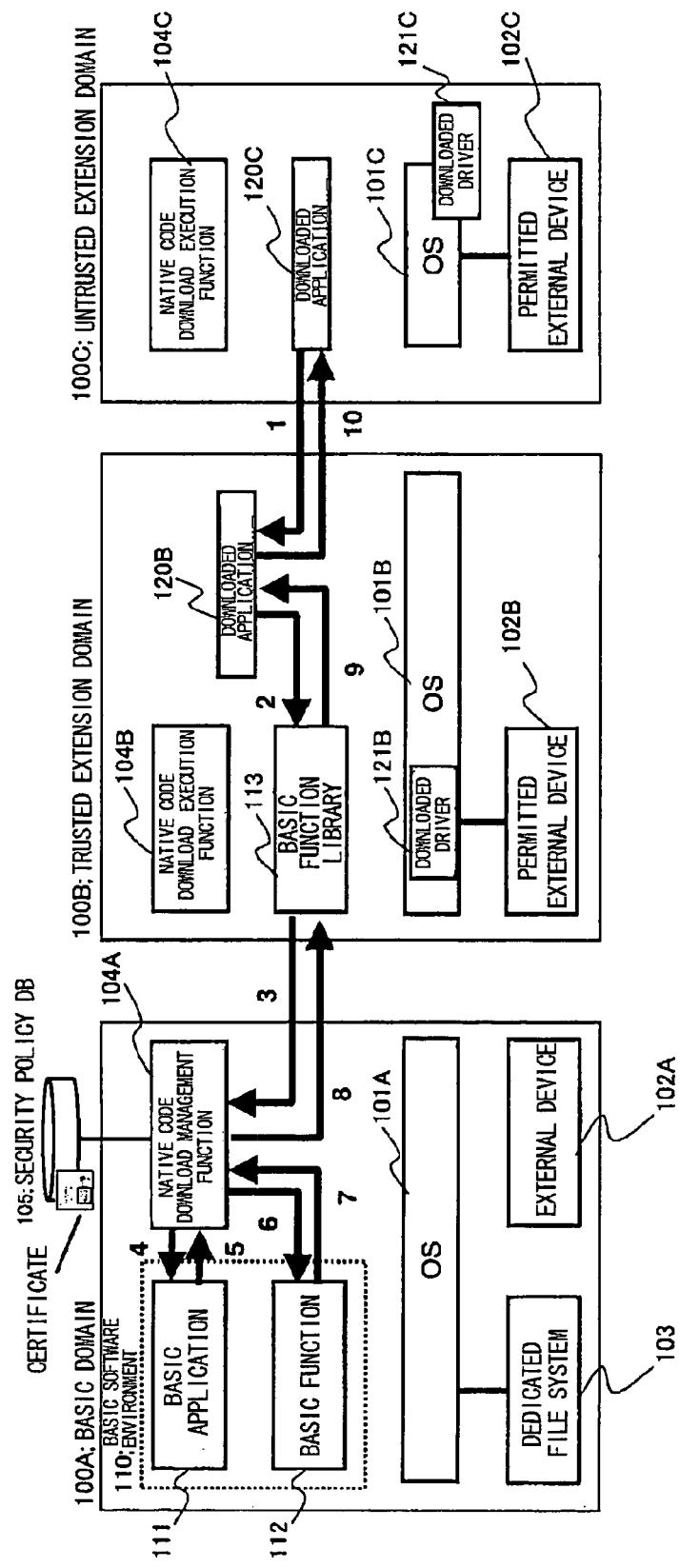
FIG. 17 is a diagram showing the operation of one embodiment of the present invention.

FIG. 17 is a diagram showing the operation of one embodiment of the present invention shown in FIG. 9 and showing the cooperation between a trusted application and an untrusted application. In FIG. 17, the number beside an arrow indicates the step number of information transfer corresponding to the line.

Step 1: The downloaded application 120C in the untrusted extension domain 100C sends data to the downloaded application 120B in the trusted extension domain 100B. The transmission of this data is performed by the inter-processor communication means shown in FIG. 7 or FIG. 8.

Step 2: The downloaded application 120B in the trusted extension domain 100B performs processing using the received data and requests the basic function library 113 to perform the basic function processing including the information associated with the untrusted.

Step 3: The basic function library 113 in the trusted extension domain 100B encrypts the request using the electronic certificate held by the application 120B and sends the encrypted request to the native code download management function 104A in the basic domain 100A. This request is made usually by the inter-processor communication means 40 shown in FIG. 7 or FIG. 8.

Step 4: The native code download management function 104A in the basic domain 100A decrypts the request and checks the completeness of the request using the electronic certificate stored in the security policy database 105. If the result of checking indicates that the request is valid, the native code download management function 104A requests the user to confirm it via the basic application 111. Although the encryption and decryption of the request are used in this example to check the correspondence between the application and the electronic certificate, it is of course possible to use any method as long as the correspondence between the application and the electronic certificate can be checked.

Step 5: In this case, 'YES' is entered as a confirmation response from the user.

Step 6: The native code download management function 104A in the basic domain 100A requests the basic function 112 to process the request.

Step 7: The basic function 112 processes the request and notifies the native code download management function 104A that the processing is completed.

Step 8: The native code download management function 104A in the basic domain 100A notifies the basic function library 113 in the trusted extension domain 100B that the processing is completed. This completion notification is sent usually by the inter-processor communication means 40 shown in FIG. 7 or FIG. 8.

Step 9: The basic function library 113 in the trusted extension domain 100B notifies the downloaded application 120B that the processing is completed.

Step 10: The downloaded application 120B in the trusted extension domain 100B notifies the downloaded application 120C in the untrusted extension domain 100C that the processing is completed. This completion notification is sent usually by the inter-processor communication means 40 shown in FIG. 7 or FIG. 8.

Figure 18:
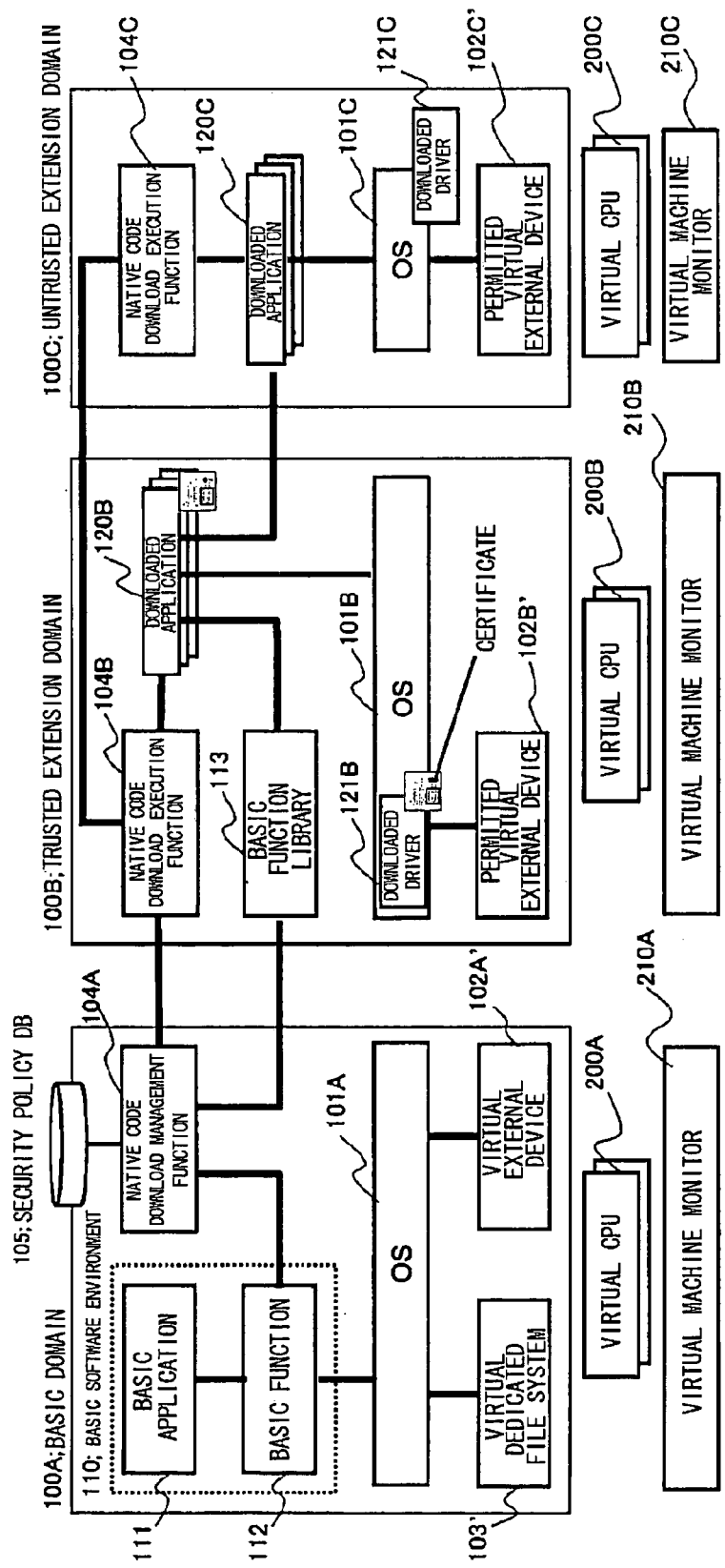
FIG. 18 is a diagram showing the configuration of a still another embodiment of the present invention.

FIG. 18 is a diagram showing the configuration of still another embodiment of the present invention. A virtual machine monitor (software layer provided between an OS and a CPU for execution by the CPU) is provided between an OS and a CPU. This makes the CPU, I/O, and memory resources virtual. A virtual machine monitor maps virtual hardware (for example, virtual input/output device) to real hardware devices between an OS and a CPU. For each of the basic domain, the trusted extension domain, and the untrusted extension domain, the OS controls the input/output (I/O) to or from a virtual dedicated file system and a virtual external device, and a virtual CPU 200A, 200B, and 200C and a virtual machine monitor 210A, 210B, and 210C are provided between the OS and the CPU to map a virtual dedicated file system 103' and a virtual external device 102A', 102B', and 102C' to the corresponding real file system and a real external device.

According to this embodiment, the hardware configuration and the software configuration are different from those in FIG. 8 and FIG. 9. In this embodiment, a virtual CPU corresponding to the basic domain is not fixed but, for example, a CPU in the trusted extension domain may be mapped as a virtual CPU in the basic domain. The implementation of a virtual machine monitor does not require the modification of the existing OS, application programs, and CPUs. According to this configuration, the number of CPUs in each domain is variable and they constitute virtual CPUs. The software configuration, composed of the basic domain, trusted extension domain, and untrusted extension domain, is the same as the configuration shown in FIG. 9 except that the devices and the file system are virtual devices and a virtual file system.

Figure 19:
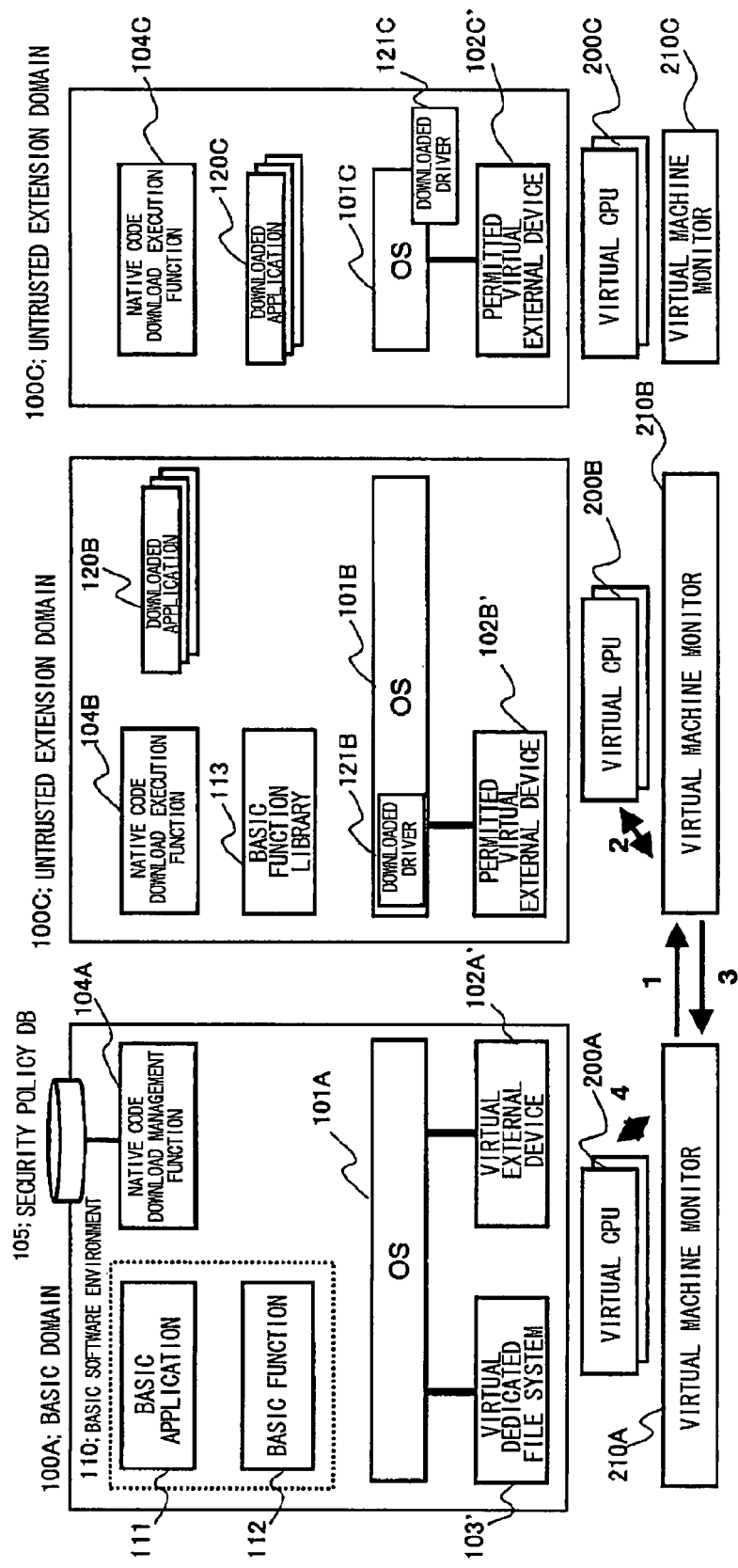
FIG. 19 is a diagram showing the operation of still another embodiment of the present invention.

FIG. 19 is a diagram showing an example of the processing procedure for the embodiment shown in FIG. 18. In FIG. 19, the number beside an arrow indicates the step number.

Step 1: The virtual machine monitor 210A in the basic domain 100A requests the virtual machine monitor 210B in the trusted extension domain 100B to transfer a CPU.

Step 2: The virtual machine monitor 210B in the trusted extension domain 100B reduces the virtual CPU resources.

Step 3: The virtual machine monitor 210B in the trusted extension domain 100B notifies the virtual machine monitor 210A on the CPU in the basic domain 100A about the transferable CPU.

Step 4: The virtual machine monitor 210A in the basic domain 100A sets the access control means to increase the number of virtual CPUs.

According to this embodiment, a CPU in another group can be operated as if it was a CPU in the basic domain. The download processing of an application is the same as that in the embodiments described above (FIG. 10 to FIG. 18) and so the description is omitted.

As a modification of this embodiment, a virtual machine monitor may be operated in the secure mode. Doing so further increases security.

Figure 20:
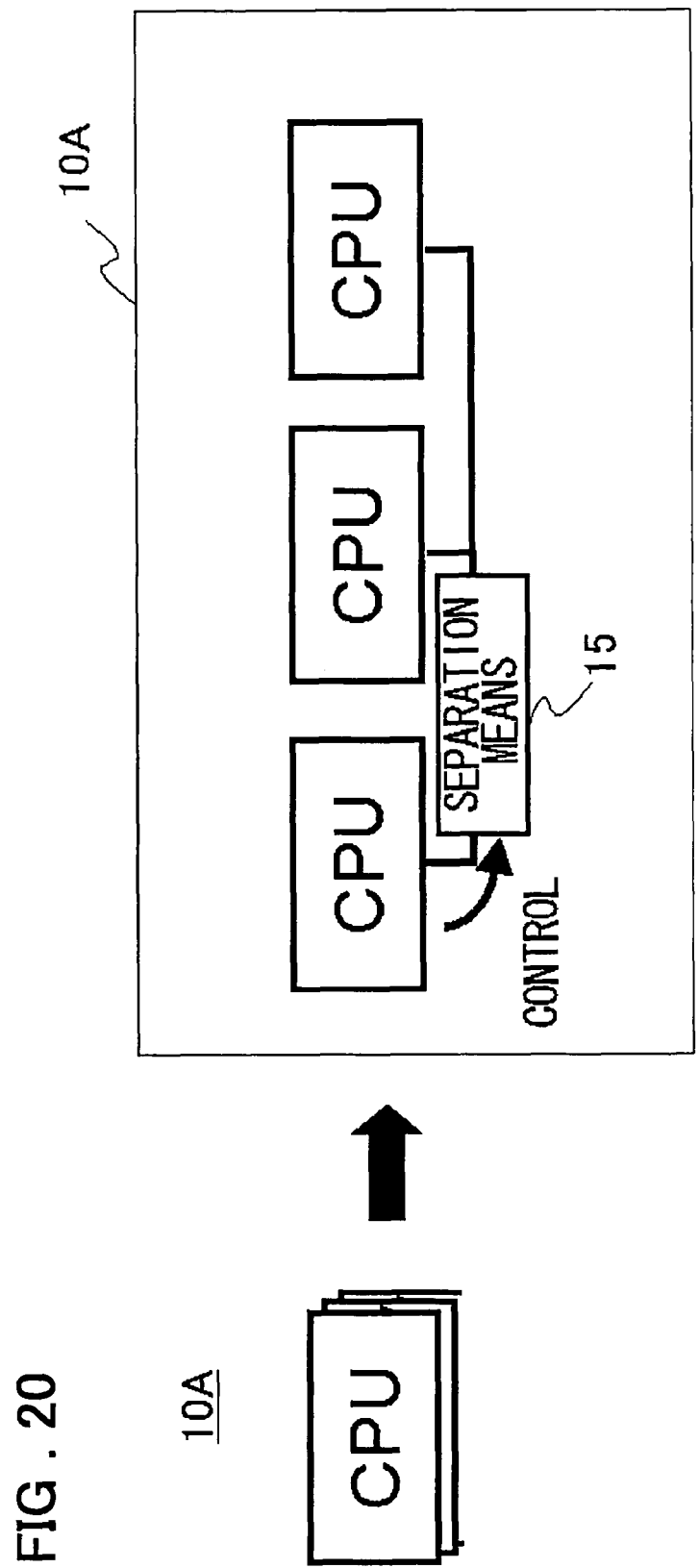
FIG. 20 is a diagram showing a modification of one embodiment of the present invention.
Figure 21:
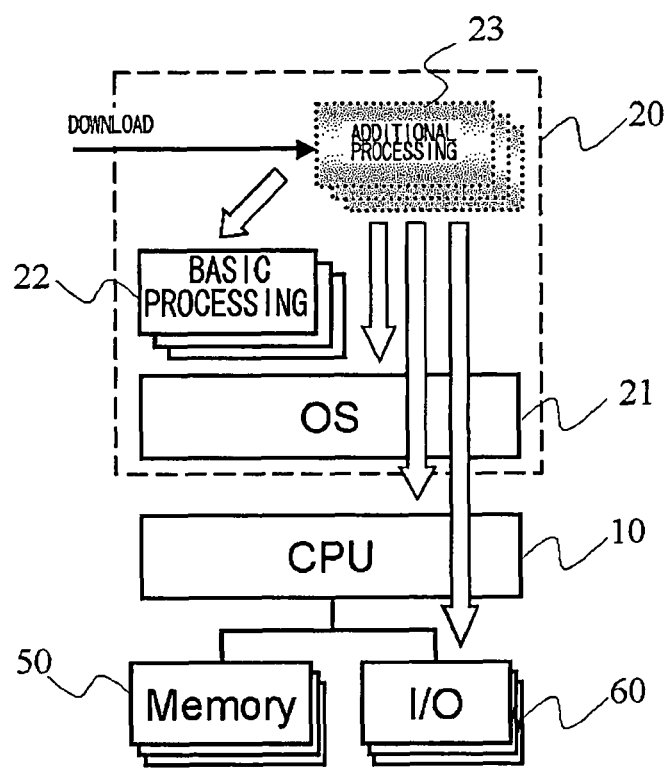
FIG. 21 is a diagram showing an example of a conventional system configuration.
Figure 22:
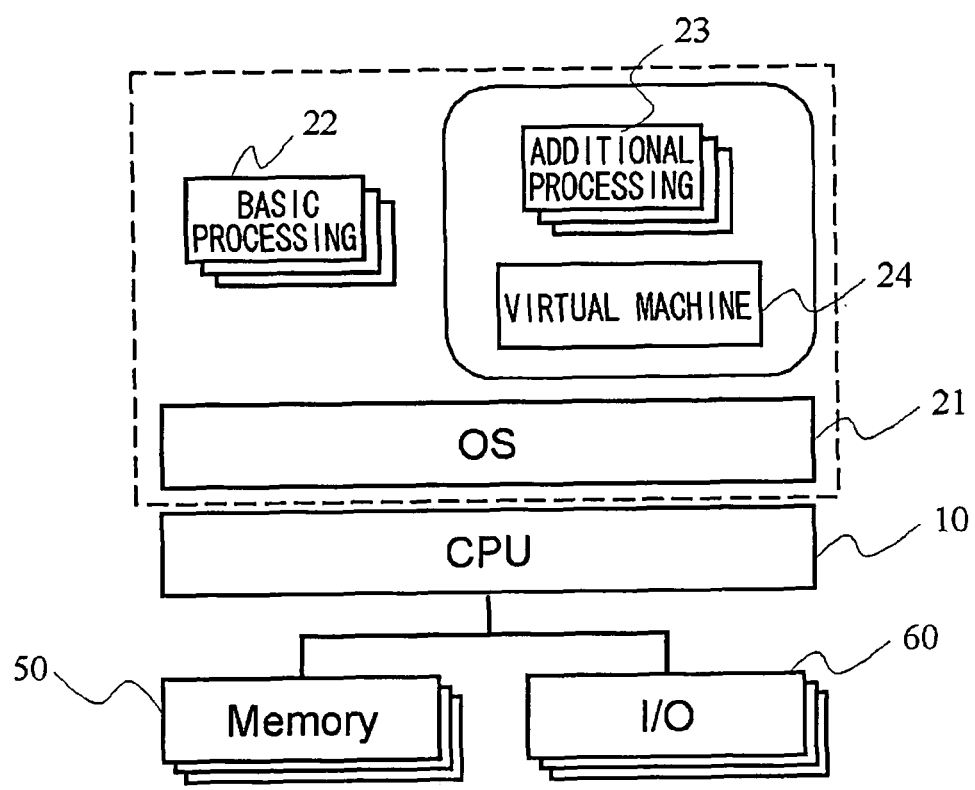
FIG. 22 is a diagram showing another example of a conventional system configuration.
Figure 23:
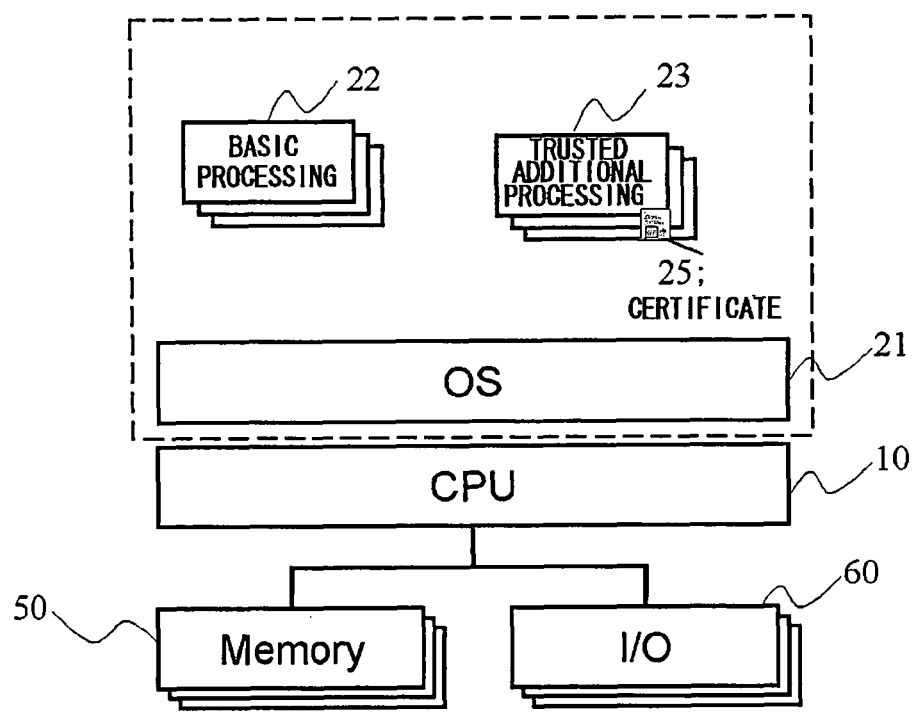
FIG. 23 is a diagram showing another example of a conventional system configuration.
Figure 24:
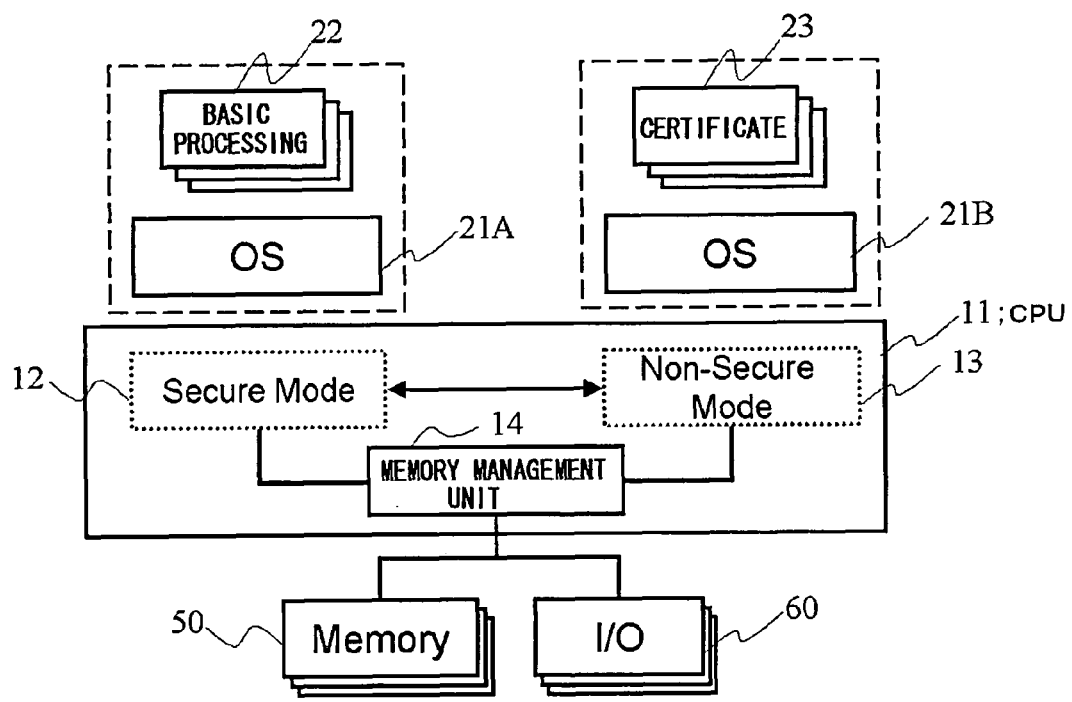
FIG. 24 is a diagram showing still another example of a conventional system configuration.

When the CPU group in each domain operates as a multiprocessor in the embodiments of the software described above, the channels that work together on a hardware basis, for example, a shootdown for flushing all entries of the TLB (Translation Lookaside Buffer; address translation table prepared in the address management unit) for invalidating a bus and a virtual multiprocessor for maintaining cache coherence, are configured so that they can all be controlled from the basic domain 100A. Alternatively, as shown in FIG. 20, the CPU group (for example, multi-CPU groups 10A and 10B in the multiprocessor configuration in FIG. 1) of each domain may be configured so that the group can be separated by separation means 15 into multiple CPUs. This makes the transfer of a CPU from one domain to another more easily and makes it possible to isolate a failing multiprocessor (graceful degrading).

Although an information communication terminal device, in which additional processing (application, device driver) is downloaded from a source (for example, network) external to the device for execution therein, is described in the embodiments described above, the present invention is not limited to such an information communication terminal device but may be applied to any information communication device. While the present invention has been described with reference to the embodiments above, it is to be understood that the present invention is not limited to the configuration of the embodiments above and that modifications and changes that may be made by those skilled in the art within the scope of the present invention are included.

The invention claimed is:

1. An information processing device comprising:
one or more computers comprising:
one or more first processors, each belonging to a first domain and each configured to execute a first processing which has a first trust level set according to a security policy;
one or more second processor processors, each belonging to a second domain different from the said first domain, and each configured to execute a second processing which has a second trust level set according to said security policy and not higher than the said first trust level;
an inter-processor communication unit configured to control a transfer of data or command between said first processor and the said second processor; and
an access control unit comprising:
a storage unit configured to store access permission data including one or more access information entries, each including:
one or more items of processor ID information of one or more second processors configured to execute said second processing;
permission range address composed of a start address and an end address of a range in which access is permitted to said one or more second processors configured to execute said second processing; and
type information of permitted access to said permission range address by one or more second processors configured to execute said second processing,
said access control unit configured to permit write access from said first processor to said access permission data, prevent write access from said second processor to said access permission data, and allow said access permission data to be updated by said first processor; and
an access permission unit configured to monitor access from said second processor belonging to said second domain to a memory and/or an input/output device, reference said access permission data, and permit said access from said second processor to a part of said memory and/or a part of said input/output device shared with said first processor, when a processor ID of said second processor matches a processor ID included in said access information entry of said access permission data, an access address from said second processor is within a range specified in said permission range address of said access information entry, and a type of access from said second processor matches a type of permitted access specified in said access information entry.

2. The information processing device as defined in claim 1, wherein said access control unit further comprises an access permission data update unit configured to update the access permission data.

3. The information processing device as defined in claim 1, wherein said access control unit further comprises an access monitoring unit configured to acquire access information on access by the processor belonging to the second domain and a learning unit configured to store the access information.

4. The information processing device as defined in claim 1, wherein said inter-processor communication unit comprises an interrupt control information processing device configured to receive an interrupt request from a processor on a sending side of information and issue an interrupt to a processor on a receiving side of the information.

5. An information processing device comprising:
one or more computers comprising:
one or more first processors, each configured to execute a first class processing having a first trust level set according to a security policy;
one or more second processor processors, each configured to execute a second class processing having a second trust level set according to said security policy and not higher than the first trust level;
a memory and an input/output device shared by said first and second processors;

an inter-processor communication unit configured to control a transfer of data or command between said first processor and said second processor; and an access control unit comprising:

a storage unit configured to store access permission data including one or more access information entries, each including:

one or more items of processor ID information of one or more second processors configured to execute said second processing;

permission range address composed of a start address and an end address of a range in which access is permitted to said one or more second processors configured to execute said second processing; and type information of permitted access to said permission range address by one or more second processors configured to execute additional processing; and said access control unit configured to permit write access from said first processor to said access permission data, prevent write access from said second processor to said access permission data, and allow said access permission data to be updated by said first processor; and an access permission unit configured to monitor access from said second processor to a memory and/or an input/output device, reference said access permission data, and permit said access from said second processor to a part of said memory and/or a part of said input/output device shared with said first processor, when a processor ID of said second processor matches a processor ID included in said access information entry of said access permission data, an access address from said second processor is within a range specified in said permission range address of said access information entry, and a type of access from said second processor matches a type of permitted access specified in said access information entry.

6. An information processing device, wherein said information processing device comprises a plurality of first processors and a plurality of second processors, wherein each of the plurality of first processors and each of the plurality of second processors are respectively said first processor and said second processor, each as defined in claim 5.

7. The information processing device as defined in claim 5, wherein said second processor executes at least one processing whose trust level is lower than that of the first processing executed by said first processor.

8. The information processing device as defined in claim 5, wherein the first processing includes vendor-provided basic processing; and the second processing includes additional processing downloaded from a network or a storage medium.

9. The information processing device as defined in claim 5, wherein the second processing includes a device driver and/or an application program to be executed in said second processor.

10. The information processing device as defined in claim 5, wherein said inter-processor communication unit comprises:

a first inter-processor communication unit configured to perform inter-processor communication for passing information from said first processor side to said second processor; and a second inter-processor communication unit configured to perform inter-processor communication for passing information from said second processor side to said first processor.

11. The information processing device as defined in claim 5, wherein said inter-processor communication unit comprises an interrupt control information processing device configured to receive an interrupt request from a processor on a sending side of information and issue an interrupt to a processor on a receiving side of the information.

12. The information processing device as defined in claim 5, wherein said inter-processor communication unit comprises an interrupt control information processing device and a shared memory, corresponding to an interrupt target processor;

wherein said interrupt control information processing device comprises:

an interrupt indication unit configured to accept an interrupt request from an interrupt-requesting processor and issue an interrupt request to the interrupt target processor;

an interrupt holding unit configured to hold the interrupt request accepted by said interrupt indication unit; and an interrupt cancellation unit configured to cancel the interrupt in response to an interrupt processing completion notification from the interrupt target processor; and wherein said shared memory comprises:

a communication area that stores data transferred from the interrupt-requesting processor to the interrupt target processor; and an exclusion control area which is for performing exclusion control for said communication area.

13. The information processing device as defined in claim 5, wherein said access control unit that stores access permission data stores, for the second processor that is permitted access, an address range for which access is permitted and information on access types permitted for the address range.

14. The information processing device as defined in claim 5, wherein said access control unit that stores the access permission data stores, for the second processor that is not permitted access, an address range for which access is not permitted and information on access types not permitted for the address range.

15. The information processing device as defined in claim 5, wherein the access permission data is allowed to be read and written by said first processor;

the access permission data is allowed only to be read by said access permission unit; and the access permission data is allowed neither to be read nor written by said second processor.

16. The information processing device as defined in claim 5, wherein said access control unit comprises a cache memory that stores a correspondence between information on access addresses of said second processor and information on access permission.

17. The information processing device as defined in claim 5, wherein said access control unit further comprises an access permission data update unit configured to update the access permission data.

18. The information processing device as defined in claim 5, further comprising:

a third processor configured to execute a third processing having a third trust level;

a second inter-processor communication unit configured to control a transfer of data or command between said second processor and said third processor; and a second access control unit configured to prevent said third processor from accessing a part of the memory and/or a part of the input/output device, shared with said first processor, according to a trust level of the third processing.

19. The information processing device as defined in claim 5, further comprising:
- a third processor configured to execute predetermined third processing having a third trust level; and
- a second inter-processor communication unit configured to perform communication between said second processor and said third processor;
- wherein each of said first processor, said second processor and said third processor comprises a memory and an input/output device connected via a bus,
- said second processor is prevented from accessing a part of the memory and/or a part of the input/output device, shared with said first processor, by said access control unit according to the second trust level of the second class processing; and
- said third processor is prevented from accessing a part of the memory and/or a part of the input/output device shared with said first processor, and/or to a part of the memory and/or a part of the input/output device shared with the second processor, by second access control unit according to the third trust level of the third processing.

20. The information processing device as defined in claim 18, wherein said third processor executes at least one processing whose trust level is lower than the second trust level of the second processing executed by said second processor.

21. An information processing device comprising a plurality of information processing devices, each as defined in claim 5, wherein each of said information processing devices is configured in a different chip.

22. An information processing device as defined in claim 21, further comprising an access limitation unit, configured between the chips, to limit a permission of access to a memory and/or input/output device according to a trust level of processing belonging to said information processing devices configured in the chips.

23. An information processing device comprising:
- a basic domain that includes:
  - a basic software environment;
  - an external device and/or a file system;
  - an operating system;
  - a security policy database that stores security information on downloaded data; and
  - a native code download management unit configured to control a download of native-code downloaded data; and
- a trusted extension domain that includes:
  - a native-code download execution unit configured to control an execution of a native-code downloaded program; and
  - an operating system;
- wherein a downloaded application program which is a trusted application program which is determined as trusted by the native code download management unit in the basic domain, is executed; and
- a downloaded device driver which is a trusted driver which is determined as trusted by the native code download management unit in the basic domain, is installed in said operating system and a permitted external device prepared in advance is accessed by said trusted driver to execute trusted additional processing; and
- wherein said basic domain is implemented in a first processor; and
- said trusted extension domain is implemented in a second processor, said information processing device comprising:
  - said first processor belonging to a first domain and configured to execute a first processing which has a first trust level set according to a security policy;
  - said second processor belonging to a second domain different from the first domain, and configured to execute a second processing which has a second trust level set according to said security policy and not higher than the first trust level;
  - an inter-processor communication unit configured to control a transfer of data or command between said first processor and said second processor; and
  - an access control unit configured to permit or prevent an access from said second processor to a part of a memory and/or a part of an input/output device, shared with said first processor, according to said second trust level of said second processing.

24. An information processing device comprising:
a basic domain that includes:
- a basic software environment;
- an external device and/or a file system;
- an operating system;
- a security policy database that stores security information on downloaded data; and
- a native code download management unit configured to control a download of native-code downloaded data,
a trusted extension domain that includes:
- a first native-code download execution unit configured to control an execution of a native-code downloaded program; and
- an operating system,
wherein, in said trusted extension domain, a downloaded application program which is a trusted application program which is determined as trusted by said native code download management unit in the basic domain, is executed; and
a downloaded device driver which is a trusted driver which is determined as trusted by the native code download management unit in the basic domain, is installed in said operating system and a permitted external device prepared in advance is accessed by said trusted driver to execute trusted additional processing, and
an untrusted extension domain that includes:
- a second native-code download execution unit configured to control an execution of a native-code downloaded program; and
- an operating system;
wherein, in said untrusted extension domain, a downloaded application program which is an untrusted application program which is determined as untrusted by said native code download management unit in the basic domain, is executed; and
a downloaded device driver which is an untrusted driver which is determined as untrusted by said native code download management unit in the basic domain, is installed in said operating system and a permitted external device prepared in advance is accessed by said device driver to execute untrusted additional processing and
wherein said basic domain is implemented in a first processor;
said trusted extension domain is implemented in a second processor; and
said untrusted extension domain is implemented in a third processor, said information processing device comprising:

said first processor belonging to a first domain and configured to execute a first processing which has a first trust level set according to a security policy;

said second processor belonging to a second domain different from the first domain, and configured to execute a second processing which has a second trust level set according to said security policy and not higher than said first trust level;

said third processor configured to execute a third processing which has a third trust level set according to said security policy and not higher than said second trust level;

a first inter-processor communication unit configured to control a transfer of data or command between said first processor and said second processor; and a first access control unit configured to permit or prevent an access from said second processor to a part of a memory and/or a part of an input/output device, shared with said first processor, according to said second trust level of said second processing a second inter-processor communication unit configured to control a transfer of data or command between said second processor and said third processor; and a second access control unit configured to permit or prevent an access from said third processor to a part of a memory and/or a part of an input/output device, shared with said first processor or said second processor, according to said third trust level of said third processing.

25. The information processing device as defined in claim 24, wherein, when downloaded data is input from said external device in the basic domain, said native code download management unit in said basic domain checks a certificate of the downloaded data and, if a result of the checking indicates that the certificate is valid, the downloaded data is sent to said first native-code download execution unit in said trusted extension domain and if the result of the checking indicates that there is no certificate or a content of the certificate is invalid, the downloaded data is sent to said second native-code download execution unit in said untrusted extension domain.

26. The information processing device as defined in claim 23, wherein, when downloaded data is input from said external device in the basic domain and if a basic function in said software environment of said basic domain recognizes the downloaded data as a downloaded application program, said native code download management unit in the basic domain checks a certificate of the downloaded application program and, if a result of the checking indicates that the certificate is valid, the downloaded application program is sent to said native code download execution unit in the trusted extension domain.

27. The information processing device as defined in claim 23, wherein, when downloaded data is input from said external device in the basic domain and if a basic function in said software environment of said basic domain recognizes the downloaded data as a downloaded driver, said native code download management unit in the basic domain checks a certificate of the downloaded driver and, if a result of the checking indicates that the certificate is valid, the downloaded driver is sent to said native code download execution unit in the trusted extension domain; and said native code download execution unit in the trusted extension domain installs the downloaded driver into the operating system in the trusted extension domain.

28. The information processing device as defined in claim 24, wherein, when downloaded data is input from said external device in the basic domain and if a basic function in said software environment of said basic domain recognizes the downloaded data as a downloaded application program, said native code download management unit in the basic domain checks a certificate of the downloaded application program and, if a result of the checking indicates that there is no certificate or a content of the certificate is invalid, the download application program is sent to said second native-code download execution unit in the untrusted extension domain via said first native code download execution unit in the trusted extension domain.

29. The information processing device as defined in claim 24, wherein, when downloaded data is input from said external device in the basic domain and if a basic function in said software environment of said basic domain recognizes the downloaded data as a downloaded driver, said native code download management unit in the basic domain checks a certificate of the downloaded driver and, if a result of the checking indicates that there is no certificate or a content of the certificate is invalid, the downloaded driver is sent to said second native code download execution unit in the untrusted extension domain via said first native code download execution unit in the trusted extension domain; and said second native code download execution unit in the untrusted extension domain installs the downloaded driver in the operating system in the untrusted extension domain.

30. The information processing device as defined in claim 23, wherein said trusted extension domain further comprises a basic function library that includes a processing group, which issues a request to a basic function in the basic software environment in the basic domain, as a library;

said basic function library in the trusted extension domain sends a request to said native code download management unit in the basic domain in response to a request from the trusted application program downloaded in the trusted extension domain; and said native code download management unit in the basic domain checks if the request received from the trusted extension domain is valid and, if the request is valid, requests said basic function in the basic software environment to process the request.

31. The information communication information processing device as defined in claim 30, wherein said basic function in the basic domain processes the request and notifies a completion of the processing to said native code download management unit in the basic domain;

said native code download management unit in the basic domain notifies the completion to the basic function library in the trusted extension domain; and the completion of the processing is notified from said basic function library to said trusted application program.

32. The information processing device as defined in claim 24, wherein said trusted extension domain further comprises a basic function library that includes a processing group, which issues a request to a basic function in the basic software environment in the basic domain, as a library;

data is sent from the untrusted application program, downloaded in the untrusted extension domain, to the trusted application program in the trusted extension domain;

the trusted application program in the trusted extension domain issues a request, which includes the data received from the untrusted application program downloaded in the untrusted extension domain, to said basic function library;

said basic function library sends the request to said native code download management unit in the basic domain in response to the request from the trusted application program in the trusted extension domain;

said native code download management unit in the basic domain checks if the received request is valid and, if the request is valid, requests a user to confirm the request and, if a confirmation result indicates permission, requests the basic function in the basic software environment to process the request; and if the confirmation result of the user indicates no permission, said native code download management unit in the basic domain notifies no permission to said basic function library.

33. The information processing device as defined in claim 32, wherein said basic function processes the request and notifies a completion of the processing to said native code download management unit in the basic domain, said native code download management unit in the basic domain notifies the completion to the basic function library in the trusted extension domain, the completion of the processing is notified from said basic function library to the downloaded trusted application program, and said downloaded application program notifies the completion of the processing to the downloaded untrusted application program in the untrusted extension domain.

34. The information processing device as defined in claim 23, wherein each of said basic domain and said trusted extension domain further comprises a virtual machine monitor, which maps virtual devices to real hardware devices, to virtualize the file system, the device, and a central processing unit (CPU).

35. The information communication information processing device as defined in claim 24, wherein each of said basic domain, said trusted extension domain, and said untrusted extension domain further comprises a virtual machine monitor, which maps virtual devices to real hardware devices, to virtualize the file system, the device, and a central processing unit (CPU).

36. The information processing device as defined in claim 34, wherein the virtual machine monitor in the basic domain requests the virtual machine monitor in the trusted extension domain or the untrusted extension domain to transfer CPU resources;

the virtual machine monitor in the trusted extension domain or the untrusted extension domain notifies a transferable CPU to the virtual machine monitor in the basic domain; and the virtual machine monitor in the basic domain increases virtual CPU resources in the basic domain.

37. An information processing device, wherein each group of processors in each of a basic domain and an untrusted extension domain can be separated into multiple processors by means of separation units, each processor in the basic domain and each processor in the untrusted extension domain being respectively said first processor and said second processor, each as defined in claim 23.

38. The information processing device as defined in claim 23, wherein the processor in the basic domain manages the processor in other domain.

39. A program execution control method using one or more computers, the method comprising:

transferring data or a command between a first processor and a second processor via an inter-processor communication unit, said first processor and said second processor belonging to a first domain and a second domain and executing a first processing and a second processing having a first trust level and a second trust level set according to a security policy, respectively, said second trust level being not higher than said first trust level; and monitoring, by an access control unit, access from the second processor to a memory and/or an input/output device, referencing, by the access control unit, access permission data including one or more access information entries, each including:
one or more items of processor ID information of one or more second processors configured to execute additional processing;
permission range address composed of a start address and an end address of a range in which access is permitted to the one or more second processors configured to execute additional processing; and
type information of permitted access to the permission range address by one or more second processors configured to execute additional processing, and permitting, by the access control unit, the access from the second processor to a part of the memory and/or a part of the input/output device shared with the first processor, when a processor ID of the second processor matches a processor ID included in the access information entry of the access permission data, an access address from the second processor is within a range specified in the permission range address of the access information entry, and a type of access from the second processor matches a type of permitted access specified in the access information entry, write access from the first processor to the access permission data being permitted, write access from the second processor to the access permission data being disabled, and the access permission data allowed to be updated by the first processor.

40. A portable information terminal comprising:
one or more computers comprising:
a one or more first processors, each belonging to a first domain and each configured to execute a first processing which has a first trust level set according to a security policy;
a one or more second processors, each belonging to a second domain different from the first domain and each configured to execute a second processing not which has a second trust level set according to said security policy and higher than the first trust level;
an inter-processor communication unit configured to control a transfer of data or command between the first processor and the second processor; and
an access control unit comprising:
a storage unit configured to store access permission data including one or more access information entries, each including:
one or more items of processor ID information of one or more second processors configured to execute additional processing;
permission range address composed of a start address and an end address of a range in which access is permitted to the one or more second processors configured to execute additional processing; and
type information of permitted access to the permission range address by one or more second processors configured to execute additional processing,
the access control unit configured to permit write access from the first processor to the access permission data, prevent write access from the second processor to the access permission data, and allow the access permission data to be updated by the first processor; and an access permission unit configured to monitor access from the second processor belonging to the second domain to a memory and/or an input/output device, reference the access permission data, and permit the access from the second processor to a part of the memory and/or a part of the input/output device shared with the first processor, when a processor ID of the second processor matches a processor ID included in the access information entry of the access permission data, an access address from the second processor is within a range specified in the permission range address of the access information entry, and a type of access from the second processor matches a type of permitted access specified in the access information entry.

41. An information communication device comprising:
one or more computers comprising:
a plurality of processors; wherein said plurality of processors belong to a plurality of domains according to a trust level of processing to be executed, said trust level being set according to a security policy; and
the processors in different domains transfer data or command with each other via an inter-processor communication unit,
said information communication device further comprising an access control unit comprising:
a storage unit configured to store access permission data including one or more access information entries, each including:
one or more items of processor ID information of one or more second processors belonging to a domain where a second trust level processing is executed;
permission range address composed of a start address and an end address of a range in which access is permitted to the one or more second processors belonging to a second domain where a second trust level processing is executed; and
type information of permitted access to the permission range address by the one or more second processors belonging to a domain where a second trust level processing is executed;
the access control unit configured to permit write access from a first processor belonging to a first domain where the first trust level processing is executed to the access permission data, prevent write access from the second processor to the access permission data, and allow the access permission data to be updated by the first processor; and
an access permission unit configured to monitor access from the second processor belonging to the second domain to a memory and/or an input/output device, reference the access permission data, and permit the access from the second processor to a part of the memory and/or a part of the input/output device shared with the first processor, when a processor ID of the second processor matches a processor ID included in the access information entry of the access permission data, an access address from the second processor is within a range specified in the permission range address of the access information entry, and a type of access from the second processor matches a type of permitted access specified in the access information entry.

42. An information processing device comprising:
one or more first CPUs, each belonging to a first domain and each configured to execute a first processing which has a first trust level set according to a security policy;
one or more second CPUs, each belonging to a second domain different from said first domain, and each configured to execute a second processing which has a second trust level set according to said security policy and not higher that said first level;
a memory and an input/output device shared by said one or more first CPUs and said one or more second CPUs; and
an access control unit comprising:
a storage unit configured to store access permission control data table including one or more access information entries, each entry of said access permission control data table including:
one or more CPU IDs of said one or more second CPUs configured to execute said second processing;
permission range address composed of a start address and an end address of a range in which access to said memory and/or said input/output is permitted to one or more second CPUs having respectively said one or more CPU IDs; and
type information of permitted access to said permission range address by said one or more second CPUs having respectively said one or more CPU IDs, and an access permission unit configured to:
monitor access from said one or more second CPUs to said memory and/or said input/output device,
reference said access permission data, and
permit said access from one of said second CPUs monitored to a part of said memory and/or a part of said input/output device shared with said one or more first CPUs, in the case wherein a CPU ID of said one of said second CPUs monitored matches a CPU ID included in said access information entry of said access permission data table, an access address from said one of said second CPUs monitored is within a range specified in said permission range address of said access information entry, and a type of access from said one of said second CPUs monitored matches a type of permitted access specified in said access information entry.

* * * * *

UNITED STATES PATENT AND TRADEMARK OFFICE
CERTIFICATE OF CORRECTION

PATENT NO. : 8,640,194 B2  Page 1 of 1
APPLICATION NO. : 11/660967
DATED : January 28, 2014
INVENTOR(S) : Inoue et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1577 days.

Signed and Sealed this
Twenty-second Day of September, 2015

Michelle K. Lee
*Director of the United States Patent and Trademark Office*